US009207481B2

United States Patent
Takeuchi et al.

(10) Patent No.: US 9,207,481 B2
(45) Date of Patent: Dec. 8, 2015

(54) DISPLAY DEVICE WITH TOUCH SENSOR, POTENTIAL CONTROL METHOD AND PROGRAM

(71) Applicant: Japan Display Inc., Tokyo (JP)

(72) Inventors: Takeya Takeuchi, Kanagawa (JP);
Hiroshi Mizuhashi, Kanagawa (JP);
Tadayoshi Katsuta, Aichi (JP);
Takehiro Shima, Aichi (JP)

(73) Assignee: Japan Display Inc., Tokyo (JP)

( * ) Notice: Subject to any disclaimer, the term of this patent is extended or adjusted under 35 U.S.C. 154(b) by 19 days.

(21) Appl. No.: 13/675,832

(22) Filed: Nov. 13, 2012

(65) Prior Publication Data

US 2013/0127752 A1 May 23, 2013

(30) Foreign Application Priority Data

Nov. 22, 2011 (JP) .................................. 2011-255533

(51) Int. Cl.
*G06F 3/041* (2006.01)
*G02F 1/1333* (2006.01)
*G06F 3/044* (2006.01)

(52) U.S. Cl.
CPC ............ *G02F 1/13338* (2013.01); *G06F 3/041* (2013.01); *G06F 3/044* (2013.01); *G06F 3/0412* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 2008/0198143 A1* | 8/2008 | Kinoshita et al. | 345/175 |
| 2010/0295824 A1* | 11/2010 | Noguchi et al. | 345/175 |
| 2010/0328255 A1* | 12/2010 | Ishizaki et al. | 345/174 |
| 2011/0109622 A1* | 5/2011 | Son et al. | 345/419 |
| 2013/0050130 A1* | 2/2013 | Brown | 345/174 |
| 2013/0113735 A1* | 5/2013 | Takeuchi et al. | 345/173 |

FOREIGN PATENT DOCUMENTS

JP 2009-244958 10/2009

* cited by examiner

*Primary Examiner* — Adam R Giesy
*Assistant Examiner* — Henok Heyi
(74) *Attorney, Agent, or Firm* — K&L Gates LLP

(57) ABSTRACT

A display device with a touch sensor includes: plural display pixel electrodes; a common electrode arranged opposite to the display pixel electrodes; a display function layer having an image display function; a display control circuit performing image display control so as to fulfill the display function of the display function layer by applying a voltage for display between the display pixel electrodes and the common electrode based on an image signal; and a touch detection electrode provided opposite to the common electrode and forming capacitance between the touch detection electrode and the common electrode, wherein a drive voltage for display applied to the common electrode by the display control circuit is used as a drive signal for the touch sensor, and a gate potential of TFT circuits included in the display pixel electrodes is increased during a period when the drive signal for the touch sensor is applied.

12 Claims, 17 Drawing Sheets

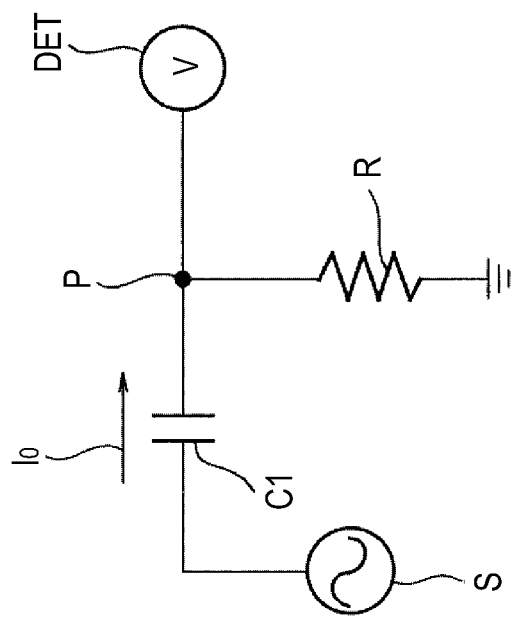
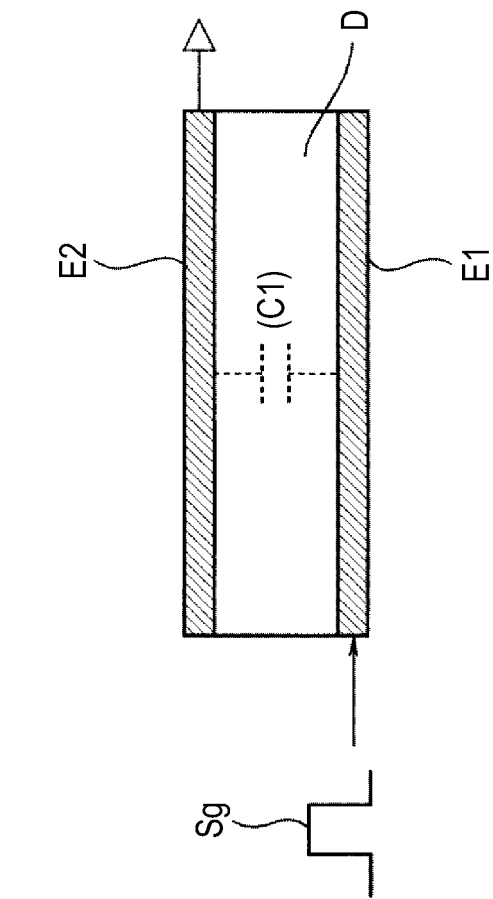
FIG.1A
FIG.1B

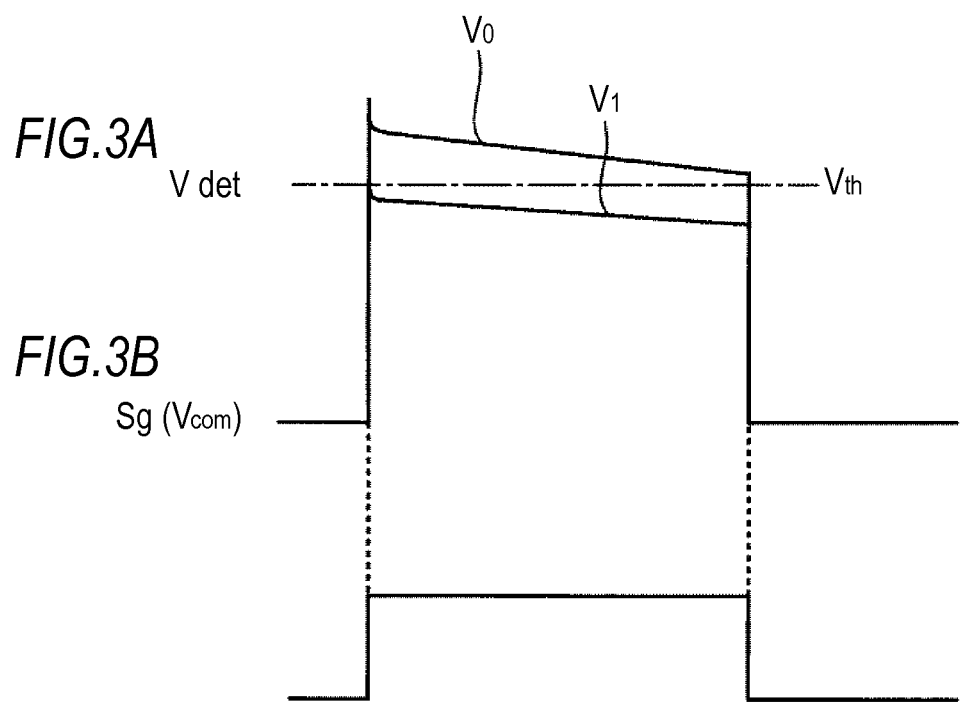

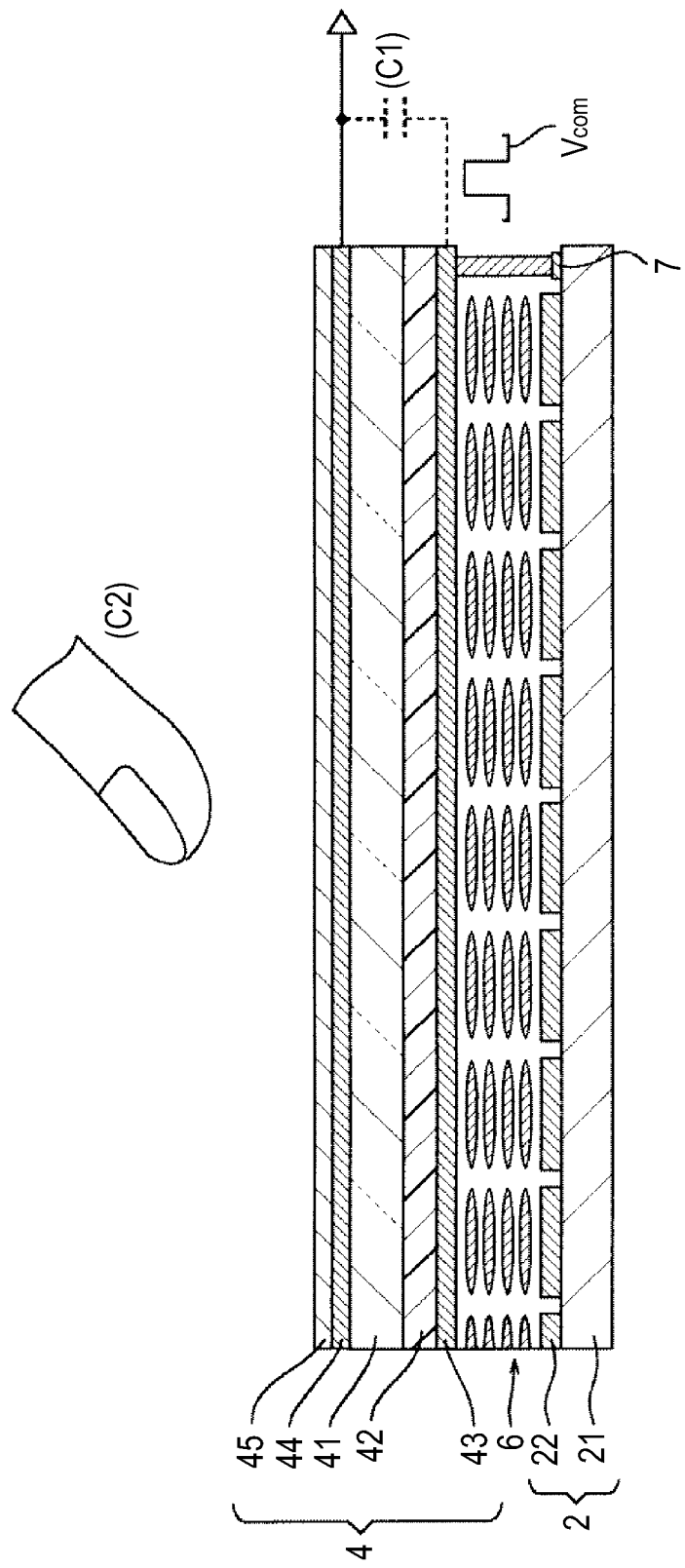

NEGATIVE POLARITY

POSITIVE POLARITY

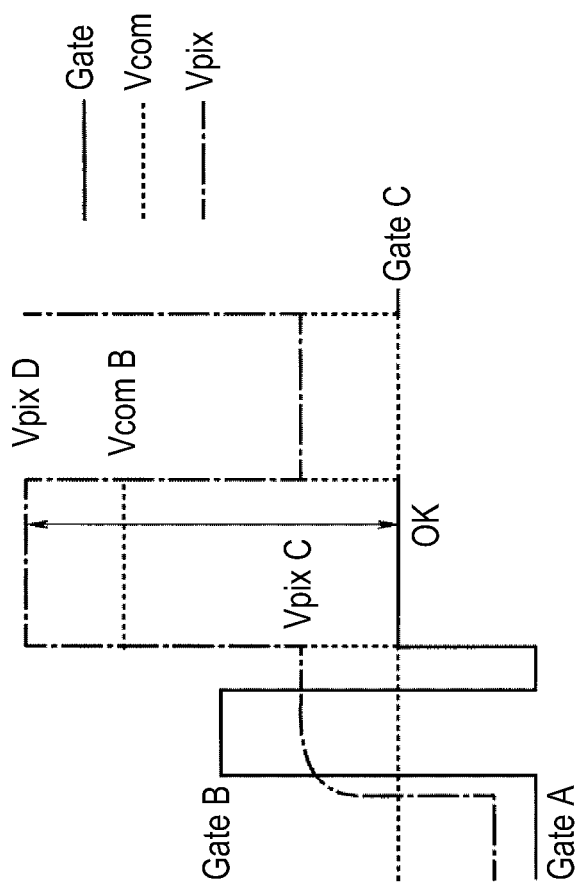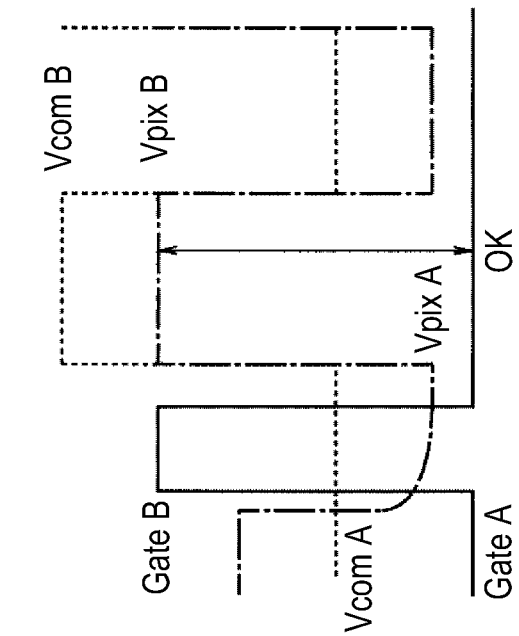

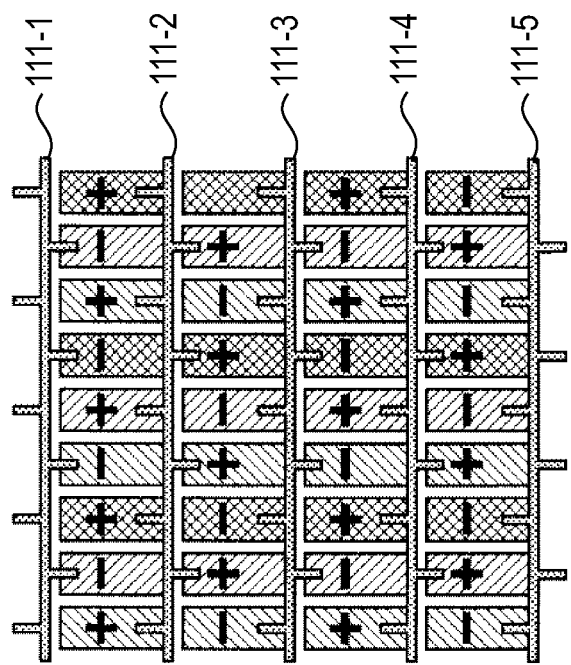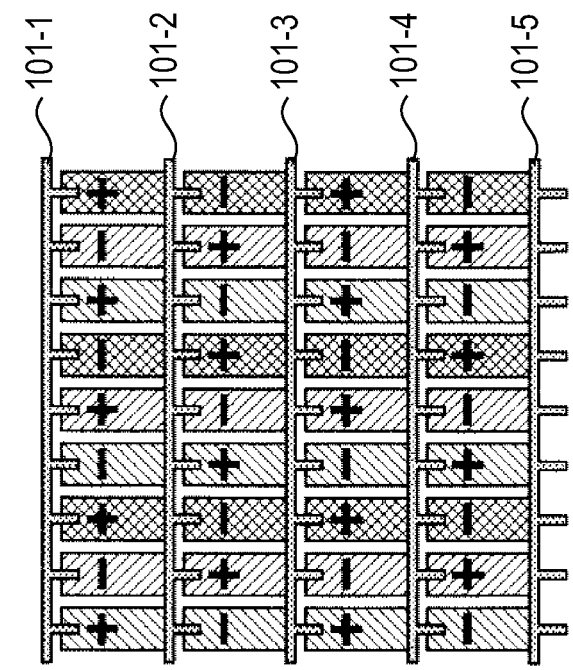

DISPLAY DEVICE WITH TOUCH SENSOR, POTENTIAL CONTROL METHOD AND PROGRAM

CROSS REFERENCES TO RELATED APPLICATIONS

The present application claims priority to Japanese Priority Patent Application JP 2011-255533 filed in the Japan Patent Office on Nov. 22, 2011, the entire content of which is hereby incorporated by reference.

BACKGROUND

The present disclosure relates to a display device with a touch sensor, a potential control method and a program. In particular, the present disclosure relates to a display device with a touch sensor, a potential control method and a program in which sensitivity of the touch sensor is improved.

In recent years, a display device attracts attention, in which a touch detection device which is so called a touch panel (hereinafter written as a touch sensor) is directly mounted on a liquid crystal display and various buttons are displayed on the liquid crystal display to thereby allow information input instead of using normal buttons. The technique enables common arrangement of a display and buttons in the tendency of screens of mobile devices to increase in size, which brings many advantages such as space saving, reduction of the number of components.

However, in the above technique, the thickness of a whole liquid crystal module is increased by mounting the touch panel. Particularly, a protection layer for preventing scratches on the touch panel is necessary in the application to the mobile devices, therefore, the thickness of the liquid crystal module is increased and thinning is difficult to be realized.

Accordingly, it is proposed that a common electrode for display originally arranged for a liquid crystal display device is also used as one electrode (drive electrode) of a pair of touch sensor electrodes, and an existing common drive signal as a drive signal for display is also used as a drive signal for the touch sensor to realize thinning (for example, refer to JP-A-2009-244958 (Patent Document 1)).

SUMMARY

In recent years, devices on which the touch sensor is mounted is increased, and user needs or user interfaces with respect to the touch sensor become diverse. For example, it is desirable to realize multi-touch detection detecting a touch with multiple fingers, proximity detection of a finger (so-called proximity) and detection by an extra-fine point pen. In order to perform the above detection with accuracy, it is necessary to improve the sensitivity of the touch sensor.

It is necessary to improve S/N (Sensor/Noise) for perform detection with the extra-fine point pen with accuracy, and it is necessary to further improve S/N for perform the so-called proximity detection. In the case where the sensitivity of the touch sensor in Patent Document 1 is increased, an amplitude of the common drive signal used both as the drive signal for display and the drive signal for the touch sensor is increased to thereby realize the increase of sensitivity. When the amplitude (Tx amplitude) of the common drive signal becomes high, the electric field strength largely changes and the accuracy can be improved.

On the other hand, a TFT (thin film transistor) used for the liquid crystal display has a withstand voltage in which reliability can be obtained. If a voltage higher than the standard is applied, the TFT is destroyed and does not function as a semiconductor device. When the voltage becomes higher than the withstand voltage in which reliability of the TFT can be obtained by increasing the amplitude (Tx amplitude) of the common drive signal, the pixel TFT is destroyed, and failure in images and failure in reliability may occur, therefore, it is difficult to increase the amplitude of the common drive signal. Due to the above circumstances, it is also difficult to improve the accuracy of the touch sensor.

In view of the above, it is desirable to improve the accuracy of the touch sensor.

One embodiment of the present disclosure is directed to a display device with a touch sensor including plural display pixel electrodes, a common electrode arranged opposite to the display pixel electrodes, a display function layer having an image display function, a display control circuit performing image display control so as to fulfill the display function of the display function layer by applying a voltage for display between the display pixel electrodes and the common electrode based on an image signal, and a touch detection electrode provided opposite to the common electrode and forming capacitance between the touch detection electrode and the common electrode, in which a drive voltage for display applied to the common electrode by the display control circuit is used as a drive signal for the touch sensor, and a gate potential of TFT circuits included in the display pixel electrodes is increased during a period when the drive signal for the touch sensor is applied.

The gate potential may be in a high state during a vertical blanking period and a horizontal blanking period.

The gate potential may become in the high state in synchronized with the drive signal for the touch sensor.

The gate potential may become in the high state when writing in a positive polarity display voltage is performed.

The one embodiment of the present disclosure is also directed to a potential control method of a display device with a touch sensor including plural display pixel electrodes, a common electrode arranged opposite to the display pixel electrodes, a display function layer having an image display function, a display control circuit performing image display control so as to fulfill the display function of the display function layer by applying a voltage for display between the display pixel electrodes and the common electrode based on an image signal, and a touch detection electrode provided opposite to the common electrode and forming capacitance between the touch detection electrode and the common electrode, the method including using a drive voltage for display applied to the common electrode by the display control circuit as a drive signal for the touch sensor, and increasing a gate potential of TFT circuits included in the display pixel electrodes is increased during a period when the drive signal for the touch sensor is applied.

The one embodiment of the present disclosure is also directed to a program for a computer controlling a display device with a touch sensor including plural display pixel electrodes, a common electrode arranged opposite to the display pixel electrodes, a display function layer having an image display function, a display control circuit performing image display control so as to fulfill the display function of the display function layer by applying a voltage for display between the display pixel electrodes and the common electrode based on an image signal, and a touch detection electrode provided opposite to the common electrode and forming capacitance between the touch detection electrode and the common electrode, the program allowing the computer to execute processing of using a drive voltage for display applied to the common electrode by the display control circuit as a drive signal for the touch sensor, and increasing a gate potential of TFT circuits included in the display pixel electrodes is increased during a period when the drive signal for the touch sensor is applied.

In the display device with the touch sensor, the potential control method and the program according to the one embodiment of the present disclosure, plural display pixel electrodes, a common electrode arranged opposite to the display pixel electrodes, a display function layer having an image display function, a display control circuit performing image display control so as to fulfill the display function of the display function layer by applying a voltage for display between the display pixel electrodes and the common electrode based on an image signal, and a touch detection electrode provided opposite to the common electrode and forming capacitance between the touch detection electrode and the common electrode are included. Then, processing of using a drive voltage for display applied to the common electrode by the display control circuit as a drive signal for the touch sensor, and increasing a gate potential of TFT circuits included in the display pixel electrodes during a period when the drive signal for the touch sensor is applied is performed.

Another embodiment of the present disclosure is directed to a display device with a touch sensor including plural display pixel electrodes, a common electrode arranged opposite to the display pixel electrodes, a display function layer having an image display function, a display control circuit performing image display control so as to fulfill the display function of the display function layer by applying a voltage for display between the display pixel electrodes and the common electrode based on an image signal, and a touch detection electrode provided opposite to the common electrode and forming capacitance between the touch detection electrode and the common electrode, in which a drive voltage for display applied to the common electrode by the display control circuit is used as a drive signal for the touch sensor, and a signal supplied to gates of TFT circuits included in the display pixel electrodes is a signal in which different three potentials are switched at given timings.

The three potentials may include a first potential to be a reference, a second potential for turning on the TFT circuits and a third potential at the time of supplying the drive signal for the touch sensor.

A potential of the signal supplied to gates of the TFT circuits in a vertical blanking period and in a horizontal blanking period may be the third potential.

The signal supplied to gates of the TFT circuits may be a signal synchronized with the drive signal for the touch sensor in which the first potential and the third potential are repeated.

The signal supplied to gates of the TFT circuits may be a signal in which different three potentials are switched at given timings when writing in a positive polarity display voltage is performed, and is a signal in which two potentials of the different three potentials are switched at given timings when writing in a negative polarity display voltage is performed.

The another embodiment of the present disclosure is also directed to a potential control method of a display device with a touch sensor including plural display pixel electrodes, a common electrode arranged opposite to the display pixel electrodes, a display function layer having an image display function, a display control circuit performing image display control so as to fulfill the display function of the display function layer by applying a voltage for display between the display pixel electrodes and the common electrode based on an image signal, and a touch detection electrode provided opposite to the common electrode and forming capacitance between the touch detection electrode and the common electrode, the method including using a drive voltage for display applied to the common electrode by the display control circuit as a drive signal for the touch sensor, and allowing a signal supplied to gates of TFT circuits included in the display pixel electrodes to be a signal in which different three potentials are switched at given timings.

The another embodiment of the present disclosure is also directed to a program for a computer controlling a display device with a touch sensor including plural display pixel electrodes, a common electrode arranged opposite to the display pixel electrodes, a display function layer having an image display function, a display control circuit performing image display control so as to fulfill the display function of the display function layer by applying a voltage for display between the display pixel electrodes and the common electrode based on an image signal, and a touch detection electrode provided opposite to the common electrode and forming capacitance between the touch detection electrode and the common electrode, the program allowing the computer to execute processing of using a drive voltage for display applied to the common electrode by the display control circuit as a drive signal for the touch sensor, and allowing a signal supplied to gates of TFT circuits included in the display pixel electrodes to be a signal in which different three potentials are switched at given timings.

In the display device with the touch sensor, the potential control method and the program according to the another embodiment of the present disclosure, plural display pixel electrodes, a common electrode arranged opposite to the display pixel electrodes, a display function layer having an image display function, a display control circuit performing image display control so as to fulfill the display function of the display function layer by applying a voltage for display between the display pixel electrodes and the common electrode based on an image signal, and a touch detection electrode provided opposite to the common electrode and forming capacitance between the touch detection electrode and the common electrode are included. Then, processing of using a drive voltage for display applied to the common electrode by the display control circuit as a drive signal for the touch sensor, and allowing a signal supplied to gates of TFT circuits included in the display pixel electrodes to be a signal in which different three potentials are switched at given timings is performed.

According to the embodiments of the present disclosure, the accuracy of the touch sensor can be improved.

Additional features and advantages are described herein, and will be apparent from the following Detailed Description and the figures.

BRIEF DESCRIPTION OF THE FIGURES

FIGS. 1A and 1B are diagrams for explaining operation principle of a display device with a touch sensor to which the present disclosure is applied, showing a non-contact state of a finger;

FIGS. 3A and 3B are diagrams for explaining operation principle of the display device with the touch sensor, showing waveform examples of a drive signal and a detection signal of the touch sensor;

FIG. 4 is a cross-sectional view showing a schematic cross-sectional structure of the display device with the touch sensor;

FIGS. 8A and 8B are diagrams showing the relation of potentials in the positive polarity and the negative polarity;

FIGS. 9A and 9B are diagrams for explaining arrangement of gate lines;

DETAILED DESCRIPTION

Hereinafter, embodiments of the present disclosure will be explained with reference to the drawings.

The present disclosure can be applied to a device in which a common electrode for display arranged for a liquid crystal display device is also used as one electrode (drive electrode) of a pair of touch sensor electrodes, and an existing common drive signal as a drive signal for display is also used as a drive signal for the touch sensor to realize thinning. Such display will be explained first.

[Display Device with Touch Sensor]

The basic principle of a touch detection system in a display device with a touch sensor according to an embodiment is shown with reference to FIGS. 1A and 1B to FIGS. 3A and 3B. The touch detection system is embodied as a capacitance-type touch sensor, in which a pair of electrodes (a drive electrode E1 and a detection electrode E2) arranged opposite to each other so as to sandwich a dielectric D are used to form a capacitor device as shown in FIG. 1A.

The structure is represented as an equivalent circuit shown in FIG. 1B. The drive electrode E1, the detection electrode E2 and the dielectric D form a capacitor device C1. One terminal of the capacitor device C1 is connected to an AC signal source S and the other terminal P is grounded through a resistance R as well as connected to a voltage detector DET. When an AC rectangular wave Sg (FIG. 3B) having a predetermined frequency (for example, approximately several kHz to several dozen kHz) is applied from the AC signal source S to the drive electrode E1 (one terminal of the capacitor C1), an output waveform (a detection signal Vdet) as shown in FIG. 3A appears at the detection electrode E2 (the other terminal P of the capacitor device C1). The AC rectangular wave Sg corresponds to a later-described common drive signal Vcom.

In a state where a finger does not touch the sensor, a current I0 corresponding to a capacitance value of the capacitor device C1 flows in accordance with charge/discharge with respect to the capacitor device C1 as shown in FIG. 1B. A potential waveform at the other terminal P of the capacitor device C1 at this time is, for example, as shown by a waveform V0 of FIG. 3A, which is detected by the voltage detector DET.

Figure 2A:
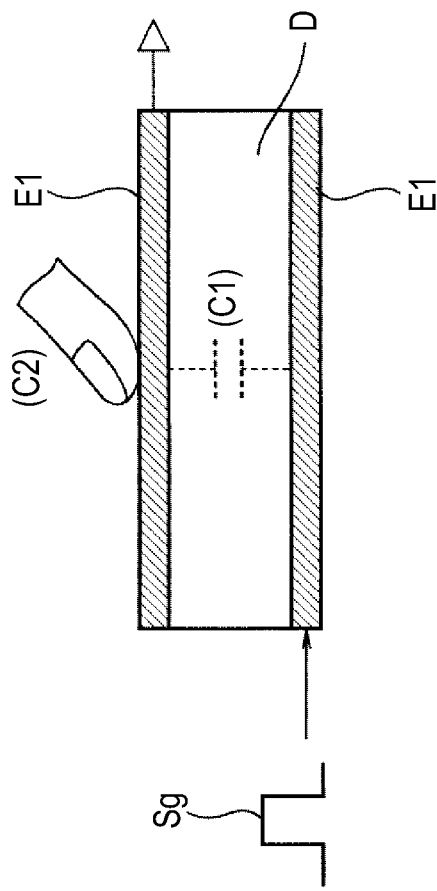
FIGS. 2A and 2B are diagrams for explaining operation principle of the display device with the touch sensor, showing a contact state of a finger.
Figure 2B:
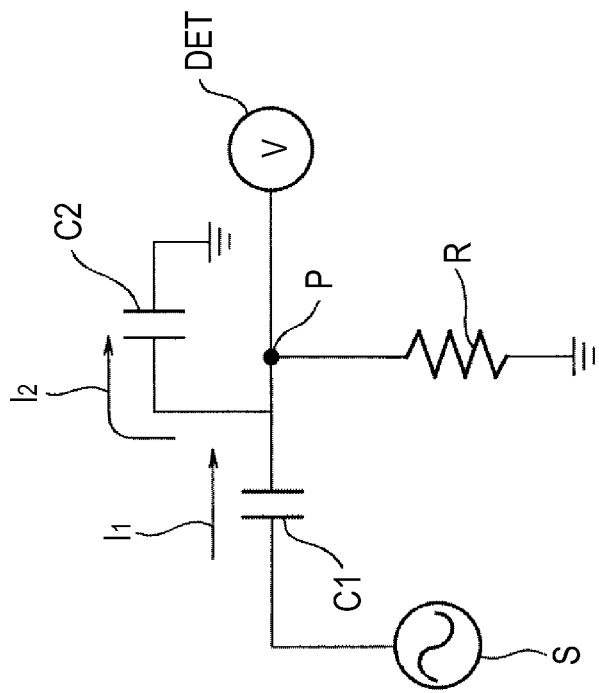

On the other hand, in a state where a touch touches the sensor, a capacitor device C2 formed by the finger is added in series to the capacitor device C1 as shown in FIGS. 2A and 2B. In this state, currents I1 and I2 respectively flow in accordance with charge/discharge with respect to the capacitor devices C1 and C2. A potential waveform at the other terminal P of the capacitor device C1 at this time is, for example, as shown by a waveform V1 of FIG. 3A, which is detected by the voltage detector DET. At this time, a potential at a point P will be a divided potential determined by values of the currents I1 and I2 flowing through the capacitor devices C1 and C2.

Accordingly, the waveform V1 has a lower value than the waveform V0 in the non-contact state. The voltage detector DET compares a detected voltage with a given threshold voltage Vth, determining the state as the non-contact state when the voltage is lower than the threshold voltage, and determining the state as the contact state when the voltage is higher than the threshold voltage as described later. The touch detection can be performed as described above.

FIG. 4 shows a cross-sectional structure of a relevant part of the display device with the touch sensor. The display device with the touch sensor uses a liquid crystal display device as a display device as well as part of electrodes (a later-described common electrode 43) originally arranged for the liquid crystal device and the a drive signal for display (a later-described common drive signal Vcom) are also used as another electrode and another signal, thereby forming the capacitance-type touch sensor.

As shown in FIG. 4, the display device with the touch sensor includes a pixel substrate 2, a counter substrate 4 arranged opposite to the pixel substrate 2 and a liquid crystal layer 6 inserted between the pixel substrate 2 and the counter substrate 4. The pixel substrate 2 includes a TFT substrate 21 as a circuit substrate and plural pixel electrodes 22 arranged on the TFT substrate 21 in a matrix state. On the TFT substrate 21, not-shown display drivers for driving respective pixel electrodes 22 and TFTs (thin-film transistors) as well as wiring lines such as source lines for supplying pixel signals to respective pixel electrodes, gate lines for driving respective TFTs are formed.

The counter substrate 4 includes a glass substrate 41, a color filter 42 formed on one face of the glass substrate 41 and a common electrode 43 formed on the color filter 42. The color filter 42 is formed by cyclically arranging color filter layers of three colors, which are, for example, red (R), green (G) and blue (B), in which three colors of R, G and B are associated with each display pixel (pixel electrode 22) as one set. The common electrode 43 is also used as a sensor drive electrode forming part of the touch sensor performing a touch detection operation, which corresponds to the drive electrode E1 in FIG. 1A.

The common electrode 43 is connected to the TFT substrate 21 by a contact conductive column 7. The common drive signal Vcom having an AC rectangular wave is applied from the TFT substrate 21 to the common electrode 43 through the contact conductive column 7. The common drive signal Vcom is for fixing display voltages of respective pixels with pixel voltages applied to the pixel electrodes 22, which is also used as the drive signal for the touch sensor and corresponds to the AC rectangular wave Sg supplied from the drive signal source S of FIG. 1B.

On the other face of the glass substrate 41, a sensor detection electrode 44 is formed, and a polarizing plate 45 is further arranged on the sensor detection electrode 44. The sensor detection electrode 44 forms part of the touch sensor, which corresponds to the detection electrode E2 in FIG. 1A.

The liquid crystal layer 6 modulates light transmitting through the layer in accordance with an electric field state, and various modes of liquid crystal such as TN (twisted nematic), VA (vertical alignment) and ECB (Electrically Controlled Birefringece) can be used.

Alignment films are respectively arranged between the liquid crystal layer 6 and the pixel substrate 2 as well as between the liquid crystal layer 6 and the counter substrate 4, and an incident-side polarizing plate is arranged under the pixel substrate 2, which are not shown here.

Figure 5:
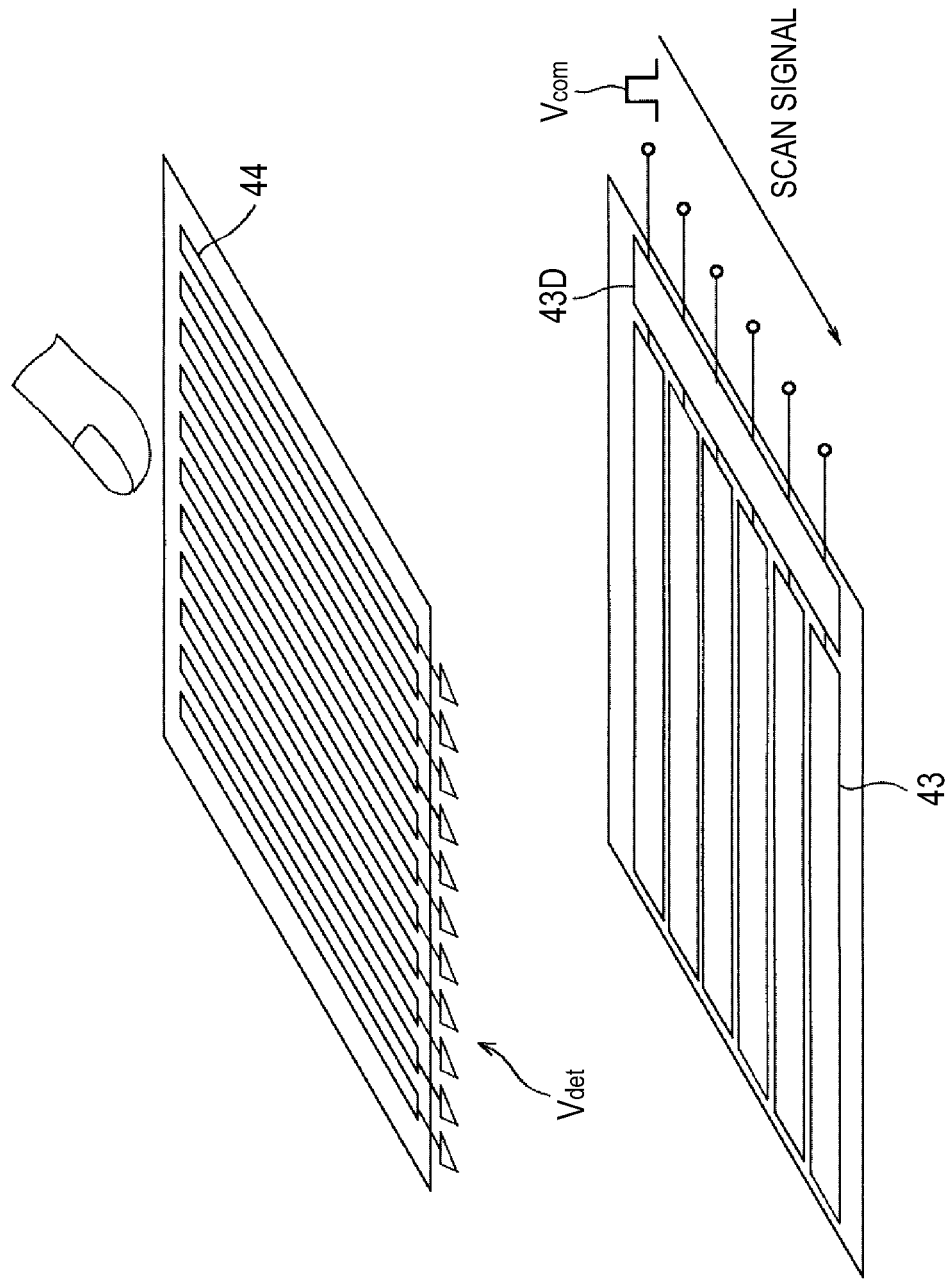
FIG. 5 is a perspective view showing a structure example of a relevant part (a common electrode and a sensor detection electrode) of the display device with the touch sensor.

FIG. 5 perspectively shows a structure example of the common electrode 43 and the sensor detection electrode 44 in the counter substrate 4. In the example, the common electrode 43 is divided to have a strip-shaped electrode pattern including plural electrodes extending in a right and left direction in the drawing. The common drive signal Vcom is sequentially supplied to respective electrodes in the pattern, and line-sequential scanning drive is performed in a time sharing manner by a driver 43D.

On the other hand, the sensor detection electrode 44 has a strip-shaped electrode pattern including plural electrodes extending in a direction orthogonal to the extending direction of the electrode pattern of the common electrode 43. Detection signals Vdet are outputted from respective electrodes in the pattern of the sensor detection electrode 44, which are inputted to a detection circuit (not shown).

Next, an operation of the display device with the touch sensor having the above structure will be explained. A display driver (not shown) of the pixel substrate 2 supplies the common drive signal Vcom in a line-sequential manner to respective electrodes in the pattern of the common electrode 43. The display driver also supplies pixel signals to the pixel electrodes 22 through the source lines as well as controls switching of the TFTs of respective pixel electrodes through gate lines in the line-sequential manner so as to be synchronized with the supply of pixel signals. Accordingly, the electric field in a vertical direction (a direction vertical to the substrate) fixed by the common drive signal Vcom and respective pixel signals is applied to respective pixels in the liquid crystal layer 6 to modulate the liquid crystal state. The display by so-called inversion driving is performed in the above manner.

On the other hand, the capacitor devices C1 are formed at intersections between respective electrodes in the pattern of the common electrode 43 and respective electrodes in the pattern of the sensor detection electrode 44 in the counter substrate 4. When the common drive signal Vcom is sequentially applied to respective electrodes in the pattern of the common electrode 43, charge/discharge is performed with respect to respective capacitor devices C1 in one column formed at intersections between the applied respective electrodes in the pattern of the common electrode 43 and respective electrodes in the pattern of the sensor detection electrode 44. As a result, the detection signals Vdet having sizes corresponding to capacitance values of the capacitor devices C1 are respectively outputted from respective electrodes in the pattern of the sensor detection electrode 44. In the state where a user's finger does not touch the surface of the counter substrate 4, the sizes of the detection signal Vdet are approximately the same. The column of the capacitor devices C1 to be charged/discharged will be moved in the line-sequential manner with the scanning by the common drive signal Vcom.

Here, when a user's finger touches any position on the surface of the counter substrate 4, the capacitor device C2 formed by the finger is added to the capacitor device C1 originally formed on the touch position. As a result, a value of the detection signal Vdet at a point where the touch position has been scanned (namely, when the common drive signal Vcom is applied to an electrode in the pattern corresponding to the touch position in the electrode pattern of the common electrode 43) becomes lower than values at other positions. The detection circuit compares the detection signal Vdet with the threshold voltage Vth and determines the position as the touch position when the detected signal Vdet is lower than the threshold voltage Vth. The touch position can be calculated from a timing when the common drive signal Vcom is applied and a timing when the detection signal Vdet lower than the threshold voltage Vth is detected.

As described above, the capacitance-type touch sensor is configured so that the common electrode 43 originally provided in the liquid crystal display device is also used as one of a pair of touch sensor electrodes including the drive electrode and the detection electrode as well as the common drive signal Vcom as the drive signal for display is also used as the drive signal for the touch sensor in the present embodiment, therefore, only the sensor detection electrode 44 has to be newly provided and it is not necessary to newly prepare the drive signal for the touch sensor.

The structure can be simplified by applying the above structure. The sensor detection electrode 44 is divided into plural electrodes in the pattern to be individually driven in a time sharing manner, therefore, the detection of the touch position can be performed.

The active-matrix liquid crystal display functioning as a display of the touch sensor display device shown in FIG. 4 and FIG. 5 as described above includes scanning (gate) lines arranged in rows, signal lines arranged in columns and pixels arranged in the matrix state so as to correspond to intersections between respective scanning lines and signal lines. The liquid crystal display also includes a horizontal drive circuit allowing devices in a row to be active in each one horizontal period (1H) and a vertical drive circuit selecting and driving pixels row by row (line by line) by sequentially scanning the scanning lines of the rows in the active state.

Then, a video signal for each horizontal period is written into pixels of each selected row, and the video signal for one frame (or one field) is held. The display device functions in this manner as well as functions as the touch panel as described above.

As described above, the common electrode 43 originally provided in the liquid crystal display device is also used as one of a pair of touch sensor electrodes including the drive electrode and the detection electrode and the common drive signal Vcom as the drive signal for display is also used as the drive signal for the touch sensor, therefore, the size of an amplitude of the common drive signal Vcom have to satisfy conditions explained below.

[Withstand Voltage]

Figure 6:
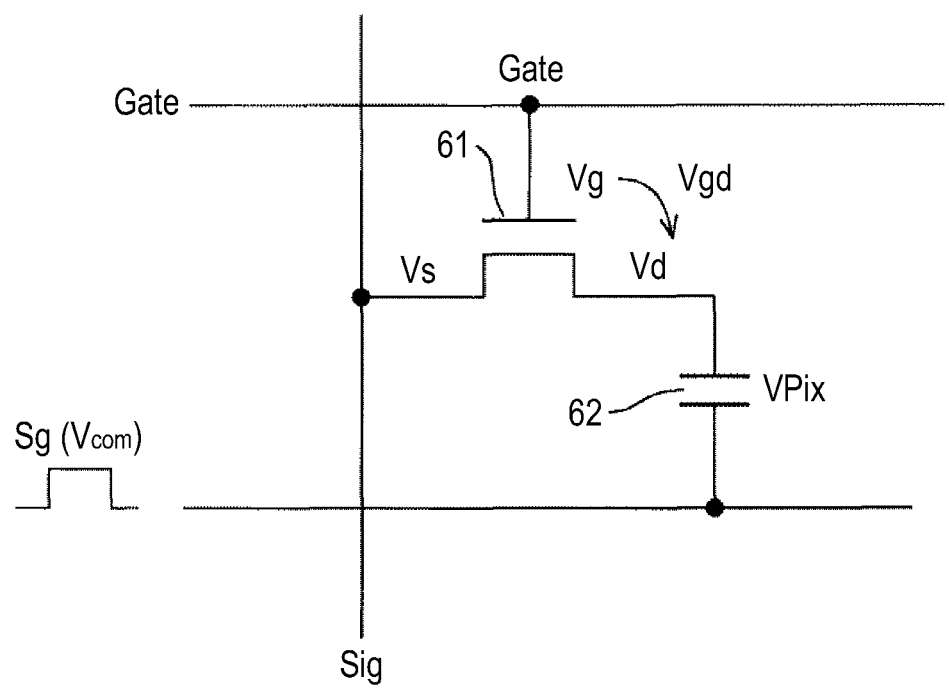
FIG. 6 is a configuration example of a pixel.

FIG. 6 is a block diagram showing a detailed configuration of one pixel (liquid crystal display device). The liquid crystal display device includes a TFT circuit 61 and a liquid crystal capacitor 62. A gate electrode of the TFT circuit 61 is connected to a gate line, a source electrode (or a signal electrode) of the TFT circuit 61 is connected to a signal line and a drain electrode of the TFT circuit 61 is connected to the liquid crystal capacitor 62. The common drive signal Vcom is applied to a counter electrode (electrode not being connected to the TFT circuit 61) of the liquid crystal capacitor 62.

The TFT circuit 61 drives the liquid crystal capacitor 62 by applying a voltage to the liquid crystal capacitor 62. That is, the TFT circuit 61 drives the liquid crystal capacitor 62 based on a signal voltage obtained when a corresponding gate signal is ON.

A lifetime of liquid crystal is reduced when a DC voltage is applied. Accordingly, in a common liquid crystal display, the voltage to be applied to the pixel electrode of the liquid crystal capacitor 62 is changed between the positive-voltage side and the negative-voltage side at regular intervals based on the voltage to be applied to the common electrode to thereby prevent the reduction of lifetime of liquid crystal.

As described later, a gate negative supply is changed on the positive-voltage side (hereinafter referred to as a positive polarity) and the negative-voltage side (hereinafter referred to as a negative polarity) in the present embodiment. Accordingly, the amplitude of the common drive signal Vcom can be increased for improving the accuracy of the touch sensor while controlling the TFT circuit not to be damaged.

As the TFT circuit 61 has the withstand voltage in which reliability can be obtained. If a voltage higher than the standard is applied, the TFT is damaged and it is difficult that the TFT functions as the semiconductor device. On the other hand, when the amplitude (Tx amplitude) of the common drive signal Vcom becomes high, the electric field strength largely changes and the sensitivity of the touch sensor can be improved.

User needs or user interfaces with respect to the touch sensor become diverse, for example, it is desirable to realize multi-touch detection detecting a touch with multiple fingers, so-called proximity detection of a finger and detection by an extra-fine point pen. In order to perform the above detection with accuracy, it is necessary to improve the sensitivity of the touch sensor, and it is necessary to increase the amplitude (Tx amplitude) of the common drive signal Vcom for improving the sensitivity.

However, when the amplitude of the common drive signal Vcom is simply increased, there is a possibility that the voltage exceeds the withstand voltage of the TFT circuit 61. A potential difference Vgd between a gate potential Vg and a drain potential (pixel potential) Vd of the TFT circuit 61 can be calculated by the following expressions from a potential Vpix of the liquid crystal capacitor 62, a potential Vcom of the amplitude of the common drive signal Vcom and a potential Gate of a power supply of the gate.

Potential difference $Vgd$=potential $Vpix$+potential $Vcom$−potential Gate

For example, assume that a potential of the withstand voltage of the TFT circuit 61 is 7, the potential Vpix=1, the potential Vcom=2 and the potential Gate=−3. In this case, the potential difference Vgd will be 6 from the above expression. When the potential difference Vgd is 6, the TFT circuit 61 operates within a range of the withstand voltage in which reliability can be obtained as the value is lower than 7 as the withstand voltage.

However, the amplitude of the common drive signal Vcom is increased for improving the sensitivity of the touch sensor so that the potential Vcom is doubled to be 4, the potential difference Vgd will be 8. When the potential difference Vgd is 8, the TFT circuit 61 operates outside the range of the withstand voltage in which reliability can be obtained as the value is higher than 7 as the withstand voltage, which may cause damage and so on. Accordingly, it is difficult to set the amplitude of the common drive signal Vcom to such potential.

Further explanation will be made concerning the above. The pixel has both polarities of the negative polarity and the positive polarity as described above. When the pixel has the positive polarity, the voltage may exceed the withstand voltage of the TFT circuit 61 at the time of increasing the amplitude of the common drive signal Vcom. This will be explained with reference to FIGS. 7A and 7B.

Figure 7A:
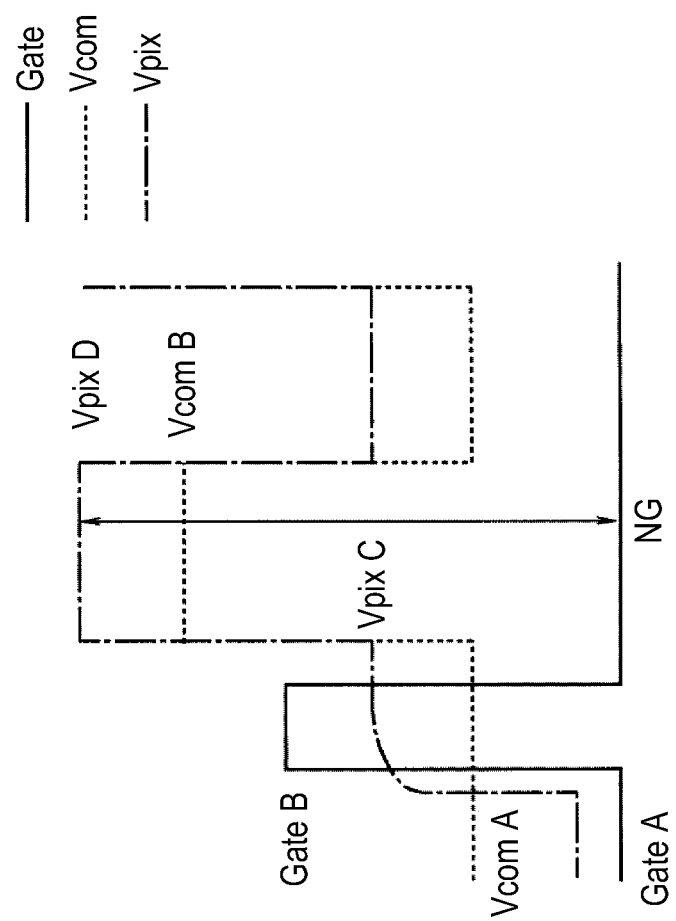
FIGS. 7A and 7B are diagrams showing the relation of potentials in a positive polarity and a negative polarity.
Figure 7B:
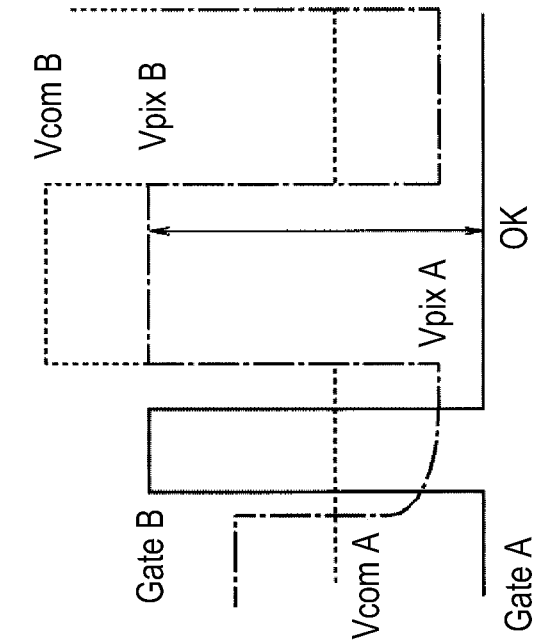

FIG. 7A is a diagram showing the relation of potentials at the time of the negative polarity, and FIG. 7B is a diagram showing the relation of potentials at the time of the positive polarity. In FIGS. 7A and 7B, the potential Gate applied to the gate of the TFT circuit 61 is represented by solid lines, the potential Vcom of the common drive signal Vcom is represented by dotted lines and the potential Vpix applied to the liquid crystal capacitor 62 is represented by dashed lines.

Referring to FIG. 7A, when the TFT circuit 61 is turned on by changing the gate signal of the TFT circuit 61 from a potential GateA to a potential GateB, the potential Vpix in the negative voltage is applied in the case of the negative polarity. The potential GateA is a reference potential and the potential GateB is a potential necessary for turning on the TFT circuit 61. When the potential Vpix to be applied is VpixA, the relation between the potential GateB and the potential VpixA is as shown in FIG. 7A.

When a potential VcomB of the common drive signal Vcom is applied in the case where the potential of the liquid crystal capacitor 62 is the potential VpixA, the potential of the liquid crystal capacitor 62 is accordingly increased to be the potential VpixB. At this time, the potential difference between the potential VpixB and the potential GateA, namely, the potential difference Vgd is within the range of withstand voltage. Accordingly, the TFT circuit 61 is not damaged.

Referring to FIG. 7B, when the TFT circuit 61 is turned on by changing the gate signal of the TFT circuit 61 from the potential GateA to the potential GateB, the potential Vpix in the positive voltage is applied in the case of the positive polarity. When the potential Vpix to be applied is VpixC, the relation between the potential GateB and the potential VpixC is as shown in FIG. 7B.

When the potential VcomB of the common drive signal Vcom is applied in the case where the potential of the liquid crystal capacitor 62 is the potential VpixC, the potential of the liquid crystal capacitor 62 is accordingly increased to be the potential VpixD. Even when the potential VcomB is the same potential as in the case of the negative polarity, the potential of the liquid crystal capacitor 62 varies to be a higher potential VpixD than the potential in the case of the negative polarity. The potential difference between the potential VpixD and the potential GateA, namely, the potential difference Vgd is higher than the case of the negative polarity and may be outside the range of the withstand voltage. Accordingly, damage and the like occur in the TFT circuit 61, which is not preferable.

As described above, the voltage may exceed the withstand voltage of the TFT circuit 61 in the case of the positive polarity by increasing the amplitude of the common drive signal Vcom is increased even when the TFT circuit 61 is designed to operate within the range of the withstand voltage in the negative polarity, therefore, it is difficult to increase the amplitude of the common drive signal Vcom. Accordingly, as shown in FIGS. 8A and 8B, the potential Gate applied to the gate of the TFT circuit 61 is switched at the time of the positive polarity and at the time of negative polarity, thereby increasing the amplitude of the common drive signal Vcom without exceeding the withstand voltage of the TFT circuit 61.

The relation of potentials in the negative polarity shown in FIG. 8A is the same as the relation of potentials in the negative polarity shown in FIG. 7A. That is, the potential Gate applied to the gate of the TFT circuit 61 in the negative polarity varies as shown below.

Potential Gate$A$→Potential Gate$B$→Potential Gate$A$

As shown above, the signal in which two potential are switched is used in the negative polarity.

The relation of potentials in the positive polarity is as shown in FIG. 8B. Also in the case shown in FIG. 8B, the common drive signal Vcom and the potential VpixC are applied to the TFT circuit 61 in the same manner as in the case shown in FIG. 7B. However, the potential Gate applied to the gate of the TFT circuit 61 varies as shown below, which is different from the case shown in FIG. 7B.

Potential Gate$A$→Potential Gate$B$→Potential Gate$C$

Though not shown in FIG. 8B, the potential is returned to the potential GateA after a given period of time passes from the potential GateC. Note that "after the given period of time passes" depends on whether the potential is changed corresponding the amplitude of the common drive signal Vcom or the potential is not changed during variation of the amplitude of the common drive signal Vcom as described later.

In the positive polarity, the TFT circuit 61 is turned on by changing the gate signal of the TFT circuit 61 from the potential GateA to the potential GateB, after that, the potential is not returned to the potential GateA but the potential falls to the potential GateC which is higher than the potential GateA and lower than the potential GateB from the potential GateA. In particular, the potential falls to the potential GateA once from the GateB, then, rises to the potential GateC when the circuit operates as the touch sensor as shown in FIG. 8B.

In the positive polarity, The potential VpixC of the positive voltage is applied to the TFT circuit 61. When the potential VcomB is applied by the common drive signal Vcom in the case where the potential of the liquid crystal capacitor 62 is the potential VpixC, the potential of the liquid crystal capacitor 62 is increased accordingly to be the potential VpixD. At this time, there is a possibility that the potential difference Vgd between the potential VpixD and the potential Gate A (potential difference VgdDA) is outside the range of the withstand voltage in the example shown in FIG. 7B, however, the potential difference Vgd between the potential VpixD and the potential GateC (potential difference VgdDC) will be a value lower than the potential difference VgdDA in the example shown in FIG. 8B, which can be within the range of the withstand voltage.

As described above, the potential GateC is set to a potential in which the potential VgdDC falls within the range of the withstand voltage. When the potential VgdDC falls within the range of the withstand voltage by setting the potential GateC, the amplitude of the common drive signal Vcom can be increased and the accuracy of the touch sensor can be improved.

As described above, the signal voltage in which two potentials alternately appear is applied to the gate of the TFT circuit 61 at the time of the negative polarity, and the signal voltage in which three potentials appear is applied to the gate of the TFT circuit 61 at the time of the positive polarity. In other words, the gate negative supply is allowed to be independent in the negative polarity and in the positive polarity, and the potential of the gate negative supply is increased in the positive polarity pixel, thereby securing the withstand voltage.

As described later, it is possible to configure the device so that the signal voltage in which three potentials appear is applied to the gate of the TFT circuit 61 also at the time of the negative polarity, however, it is necessary, for configuring the device, that the switching timing of potentials of the signal in which three potentials appear satisfies given conditions. The conditions and so on will be described later. First, the case where the gate negative supply is allowed to be independent in the negative polarity and in the positive polarity, and the signal voltage in which two potentials appear alternately is applied to the gate of the TFT circuit 61 at the time of the negative polarity and the signal voltage in which three potential appear is applied to the gate of the TFT circuit 61 at the time of the positive polarity will be continuously explained.

Hereinafter, arrangements of pixels and configurations of gate buffers in the case where the gate negative supply is independent in the negative polarity and the positive polarity will be explained. The explanation will be made while comparing the case where the gate negative supply is independent with the case where the gate negative supply is not independent in the negative polarity and the positive polarity explained with reference to FIGS. 7A and 7B.

[Polarity Arrangement Pattern of Pixels]

FIGS. 9A and 9B are views for explaining a polarity arrangement pattern of pixels and a connection pattern of gate lines. FIG. 9A shows a case where the same gate signal is used for the negative polarity and the positive polarity as explained with reference to FIGS. 7A and 7B, and FIG. 9B shows a case where different gate signals are used for the negative polarity and the positive polarity as explained with reference to FIGS. 8A and 8B. The polarity arrangement pattern shown in FIGS. 9A and 9B is called a dot inversion drive, which is a pattern in which positive polarity pixels and negative polarity pixels are arranged in a zigzag pattern.

In the dot inversion drive, for example, negative polarity pixels are arranged in up, down, right and left directions of a positive polarity pixel at an arbitrary position, and similarly, positive polarity pixels are arranged at up, down, right and left directions of a negative polarity pixel. As shown in FIG. 9A, when the same gate signal is used for the negative polarity and the positive polarity, the same gate signal is supplied to pixels of both the negative polarity and the positive polarity.

Accordingly, for example, a gate line 101-1 is connected to respective pixels of both the negative polarity and the positive polarity arranged in a single horizontal row on an upper side in the drawing for supplying the gate signal. Similarly, a gate line 101-2 is connected to respective pixels of both the negative polarity and the positive polarity arranged in the second horizontal row from the top in the drawing for supplying the gate signal.

As described above, when the same gate signal is used for the negative polarity and the positive polarity, gate lines are connected independent of pixels of the negative polarity and the positive polarity.

On the other hand, as shown in FIG. 9B, when the different gate signals are used for the negative polarity and the positive polarity, different gate signals are supplied to the negative polarity pixels and the positive polarity pixels. Accordingly, for example, a gate line 111-2 is connected to respective pixels of the positive polarity in pixels arranged in the single horizontal row on the upper side in the drawing and respective pixels of the positive polarity in pixels arranged in the second horizontal row from the top for supplying the gate signal.

Similarly, a gate line 111-3 is connected to respective negative polarity pixels in pixels arranged in the second horizontal row from the top and respective negative polarity pixels in pixels arranged in the third horizontal row from the top for supplying the gate signal.

As described above, when different gate signals are used for the negative polarity and the positive polarity, pixels of the same polarity are connected to the same gate line. In the example shown in FIG. 9B, the case where pixels of the same polarity positioned adjacent to each other in the vertical direction are connected to the same gate line is shown, however, the embodiment is not limited to the example. The embodiment can be applied to any structure in which pixels of the same polarity are connected to the same gate line. For example, the embodiment can be applied not only to the dot inversion drive method as shown in FIGS. 9A and 9B but also to a line inversion drive method shown in FIG. 10.

Figure 10:
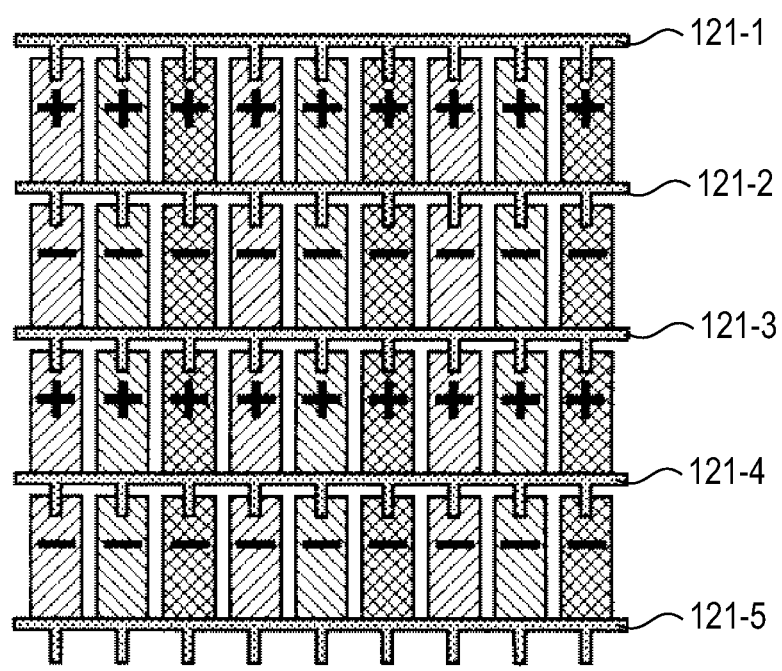
FIG. 10 is a diagram for explaining arrangement of gate lines.

In the line inversion drive method, for example, pixels of the same positive polarity are arranged in a right and left direction of a positive polarity pixel at an arbitrary position, and similarly, pixels of the same negative polarity are arranged in the right and left direction of a negative pixel. That is, positive pixels or negative pixels are arranged in the whole one line, and the positive polarity and the negative polarity are alternately arranged row by row. As shown in FIG. 10, pixels of the negative polarity or the positive polarity are arranged in each line, therefore, the same gate signal is used in one line.

Accordingly, for example, a gate line 121-1 is connected to respective pixels of the positive polarity arranged in a single horizontal row on an upper side in the drawing for supplying the gate signal. Similarly, a gate line 121-2 is connected to respective pixels of the negative polarity arranged in the second horizontal row from the top in the drawing for supplying the gate signal.

As described above, when different gate signals are used for the negative polarity and the positive polarity, the pixels of the same polarity are connected to the same gate line.

[Configurations of Gate Buffers]

Figure 11A:
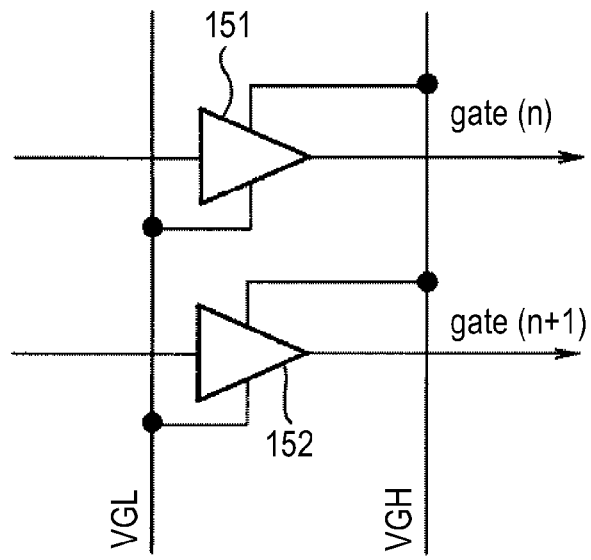
FIGS. 11A and 11B are diagrams indicating configuration examples of gate buffers.
Figure 11B:
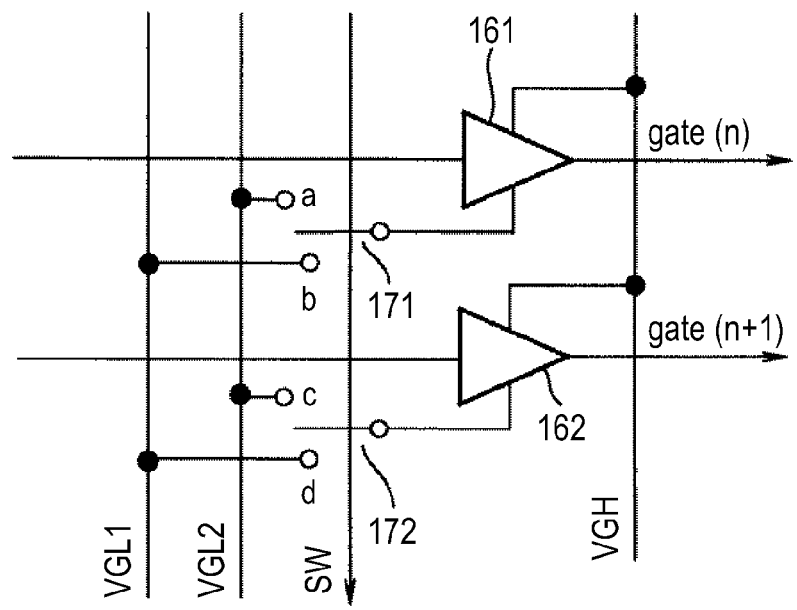

FIGS. 11A and 11B are diagrams showing configurations of gate buffers. FIG. 11A shows a configuration of gate buffers used when the gate lines and pixels are connected as shown in FIG. 9A and the same gate signal is used for the negative polarity and the positive polarity, and FIG. 11B shows a configuration of gate buffers used when the gate lines and the pixels are connected as shown in FIG. 9B and the different gate signals are used for the negative polarity and the positive polarity.

Referring to FIG. 11A, a buffer 151 and a buffer 152 are respectively connected to a VGL line outputting a signal in a potential corresponding to the potential GateA and a VGH line outputting a signal in a potential corresponding to the potential GateB. The buffer 151 and the buffer 152 switch the signal supplied from the VGL line and the signal supplied from VGH line at given timings respectively based on respective instructions from the outside which are not shown, supplying the signal to connected gate lines.

The buffer 151 is connected to a gate line (n) and the buffer 152 is connected to a gate line (n+1). For example, when the buffer 151 is connected to the gate line 101-1 (FIG. 9A), the buffer 152 is connected to the gate line 101-2 (FIG. 9A). Though the two buffers are shown in FIG. 11A, buffers corresponding to the number of the gate lines are provided.

When different gate signals are used for the negative polarity and the positive polarity with respect to the configuration of buffers, a configuration of gate buffers will be as shown in FIG. 11B. In the configuration of gate buffers shown in FIG. 11B, two buffers which are a buffer 161 and a buffer 162 are shown in the same manner as the configuration of gate buffers shown in FIG. 11A, however, buffers corresponding to the number of gate lines are provided. The two buffers of them are shown for explanation.

The buffer 161 and the buffer 162 are the same as the case of the buffer 151 and the buffer 152 shown in FIG. 11A in a point that the buffer 161 and the buffer 162 are respectively connected to the VGH line outputting the signal in the potential corresponding to the potential GateB. However, the buffer 161 and the buffer 162 differs from the buffer 151 and the buffer 152 shown in FIG. 11A in a point that the buffer 161 and the buffer 162 are connected to two VGL lines, that is, the buffer 161 is connected to a VGL1 line outputting a signal in a potential corresponding to the potential GateA through a switch 171 and the buffer 162 is connected to a VLG2 line outputting a signal in a potential corresponding the potential GateC through a switch 172.

The buffer 161 and the buffer 162 switch the signal supplied from the VGL1 line or the VGL2 line and the signal supplied from the VGH line at given timings based on respective instructions from the outside which are not shown, supplying the signal to connected gate lines. The switch 171 and the switch 172 also switch the connection of the VGL1 line and the VGL2 at given timings based on respective instructions from the outside which are not shown, supplying the signal supplied from the VGL1 line or the VGL2 line to the buffer 161 and the buffer 162 respectively.

The buffer 161 is connected to the gate line (n) and the buffer 162 is connected to the gate line (n+1). For example, when the buffer 161 is connected to the gate line 111-2 (FIG. 9B), the buffer 162 is connected to the gate line 111-3 (FIG. 9B).

For example, when the switch 171 is connected to a terminal "a", the signal in the potential corresponding to the potential GateC is ready to be supplied from the VGL2 line to the buffer 161. The potential GateC is a signal voltage supplied to pixels of the positive polarity. The signal in the potential corresponding to the potential GateC is outputted to the gate line connected from the buffer 161 at a timing when the TFT circuits 61 of pixels of the positive polarity are turned on.

At this time, the switch 172 is connected to a terminal "d" and the signal in the potential corresponding to the potential GateA is ready to be supplied from the VGL1 line to the buffer 161. The potential GateA is the signal voltage supplied to the negative polarity pixels or the signal voltage supplied to the positive polarity pixels when the device does not function as the touch sensor of the positive polarity pixels. The signal in the potential corresponding to the potential GateA is outputted to the gate line connected from the buffer 161 at a timing when the TFT circuits 61 of pixels of the negative polarity or the positive polarity are turned on.

As describe above, the potential of the negative supply applied to the gate can be changed at the time of the negative polarity and at the time of the positive polarity by providing switches to switch the VGL lines. It is also possible to prevent the voltage from exceeding the withstand voltage of the TFT circuit 61, thereby allowing the TFT circuit 61 to operate within the range in which reliability can be kept. Additionally, the amplitude of the common drive signal Vcom can be increased within a range in which the voltage does not exceed the withstand voltage of the TFT circuit 61, therefore, the accuracy of the touch sensor can be improved.

[Explanation With Reference to Timing Charts]

Furthermore, to secure the withstand voltage of the TFT circuit 61 by increasing the potential of the gate negative supply of pixels of the positive polarity when the device functions as the touch sensor will be explained with reference to timing charts.

As described above, writing performed when the display device with the touch sensor functions as the display device includes writing on the positive polarity side and the negative polarity side to perform AC inversion driving so that deviation of charges does not occur. The potential difference Vgd will be highest when the pixel TFT (TFT circuit 61) is in a period of holding the pixel potential in which positive polarity writing is performed. Accordingly, explanation has been made that the amplitude of the common drive signal Vcom can be increased by controlling the gate potential of the pixel TFT to have the potential (potential GateC) in which the potential difference Vgd does not exceed the given standard as well as the pixel potential does not leak with respect to the pixel in which the positive polarity writing side has been performed.

At this time, the potential is controlled to be the above potential GateC for allowing the device to function as the touch sensor in a vertical blanking period (V blank) and a horizontal blanking period (H blank) which are periods of time when writing is not performed, thereby controlling the potential so that leakage due to image data does not occur. It is desirable that a Sig-potential is a fixed potential in which leakage does not occur.

Figure 12:
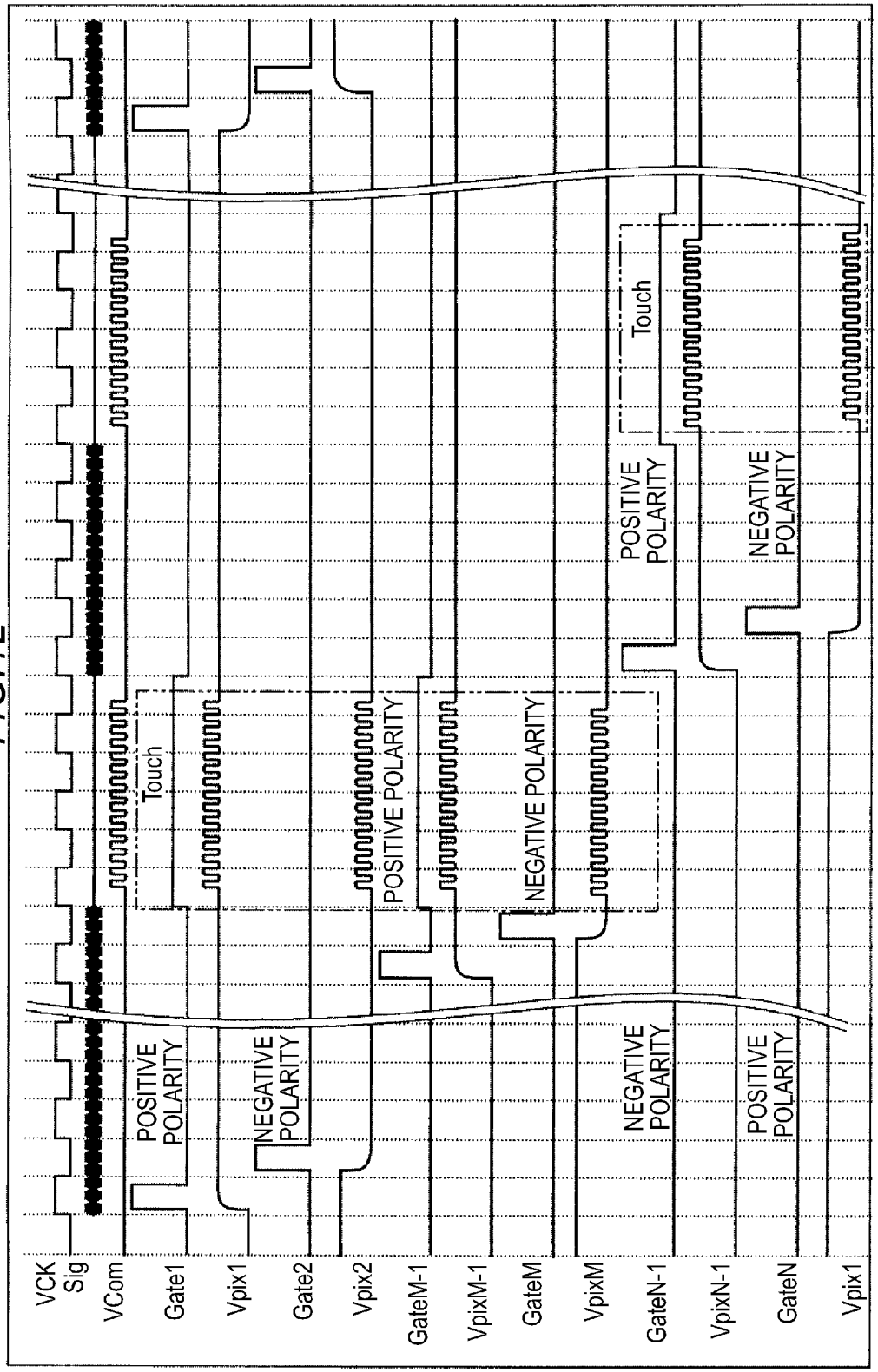
FIG. 12 shows timing charts for explaining the relation of potentials in a blanking period.

The display device with the touch sensor functions as the touch sensor by using the vertical blanking period and the horizontal blanking period. The control of increasing the potential of the gate negative supply of the polarity pixels is performed in the vertical blanking period and the horizontal blanking period respectively. FIG. 12 shows timing charts in the vertical blanking period.

Referring to FIG. 12, VCK represents a vertical synchronization signal and Sig represent a video signal. Vcom, Gate1 to GateN and Vpix1 to VpixN respectively represent the potential Vcom, the potentials Gate and the potentials Vpix. Moreover, Gate 1 to Gate N respectively represent potentials of output signals from buffers connected to gate lines 1 to N, and Vpix1 to VpixN respectively represent potentials of the liquid crystal capacitors C connected to the gate lines 1 to N. Also, Vcom, Gate1 to GateN, and Vpix1 to VpixN satisfy the relation of potentials explained with reference to FIGS. 8A and 8B.

The common drive signal Vcom is a signal with a given cycle during the vertical blanking period, in which the potential VcomA and the potential VcomB are repeated, sequentially supplied to respective pixels. Assume that the Gate1 is a potential of the gate line 1 connected to the positive polarity pixels. In this case, the positive polarity pixels connected to the gate line 1 are turned on when the potential GateA is switched to the potential GateB at a timing shown in FIG. 12, and writing is performed based on the video signal. The potential Vpix1 is maintained in the potential VpixC after the writing is performed.

When the vertical blanking period starts and the common drive signal Vcom in which the potential VcomA and the potential VcomB are repeated with a given cycle is added while the potential Vpix1 of the liquid crystal capacitor C is maintained in the potential VpixC, the potential Vpix1 of the liquid crystal capacitor C becomes a signal in which the potential VpixC and the potential VpixD are repeated so as to correspond to the cycle. As the potential Vpix1 of the liquid crystal capacitor C of the positive polarity pixels varies as described above, the potential of Gate1 is fixed to the potential GateC during the period. That is, the potential of Gate1 is fixed to the potential GateC during the blanking period as shown in FIG. 12.

As described above, the potential of Gate1 is fixed to the potential GateC during the blanking period at the time of the positive polarity, therefore, it is possible to control the voltage not to exceed the withstand voltage of the TFT circuit 61 even when the potential Vpix1 of the liquid crystal capacitor C varies between the potential VpixC and the potential VpixD as explained with reference to FIG. 8B. Additionally, the gate negative voltage is maintained to the potential GateC during the blanking period in which the device functions as the touch sensor, thereby increasing the amplitude of the common drive signal Vcom supplied during the blanking period (increasing the potential difference between the potential VcomA and the potential VcomB), which improves the performance as the sensor.

Next, variation in potentials of negative polarity pixels will be explained. Assume that Gate2 next to Gate 1 is a potential of the gate line 2 connected to the negative polarity pixels. In this case, the negative polarity pixels connected to the gate line 2 are turned on when the potential GateA is switched to the potential GateB at a timing shown in FIG. 12, and writing is performed based on the video signal. The potential Vpix2 is maintained in the potential VpixB after the writing is performed.

When the vertical blanking period starts and the common drive signal Vcom in which the potential VcomA and the potential VcomB are repeated with a given cycle is added while the potential Vpix2 of the liquid crystal capacitor C is maintained in the potential VpixB, the potential Vpix2 of the liquid crystal capacitor C becomes a signal in which the potential VpixA and the potential VpixB are repeated so as to correspond to the cycle. As the potential Vpix2 of the liquid crystal capacitor C of the negative polarity pixels varies as described above, the potential of Gate2 is returned and fixed to the potential GateA during the period. That is, the potential of Gate2 is returned to the potential GateA from the potential GateB and fixed to the potential GateA also during the blanking period as shown in FIG. 12.

In the case of the positive polarity, the switch 171 of the gate buffer 161 (FIG. 11B) is connected to a terminal "b" at a point before the vertical blanking period, and the gate buffer 161 outputs a signal in the potential GateA supplied through the VGL1 line. Then, in the vertical blanking period, the switch 171 is switched from the terminal "b" to the terminal "a", and the gate buffer 161 outputs a signal in the potential GateC supplied through the VGL2 line.

As described above, the negative supply with respect to the positive polarity pixels is maintained in the potential GateC which is lower than the potential GateB used when turning on the TFT circuit 61 and higher than the reference potential GateA during the vertical blanking period. The negative supply with respect to the negative polarity pixels is returned to the reference potential GateA from the potential GateB used when turning on the TFT circuit 61, and then, maintained in the potential GateA during the vertical blanking period.

In the variation of potentials applied to gates of positive polarity pixels explained with reference to FIG. 12, the potential of the negative supply is made to be higher during the vertical blanking period. It is also possible that the potential of the negative supply is increased and reduced in synchronization with the common drive signal Vcom instead of increasing the potential of the negative supply during the vertical blanking period. Timing charts in this case are shown in FIG. 13.

Figure 13:
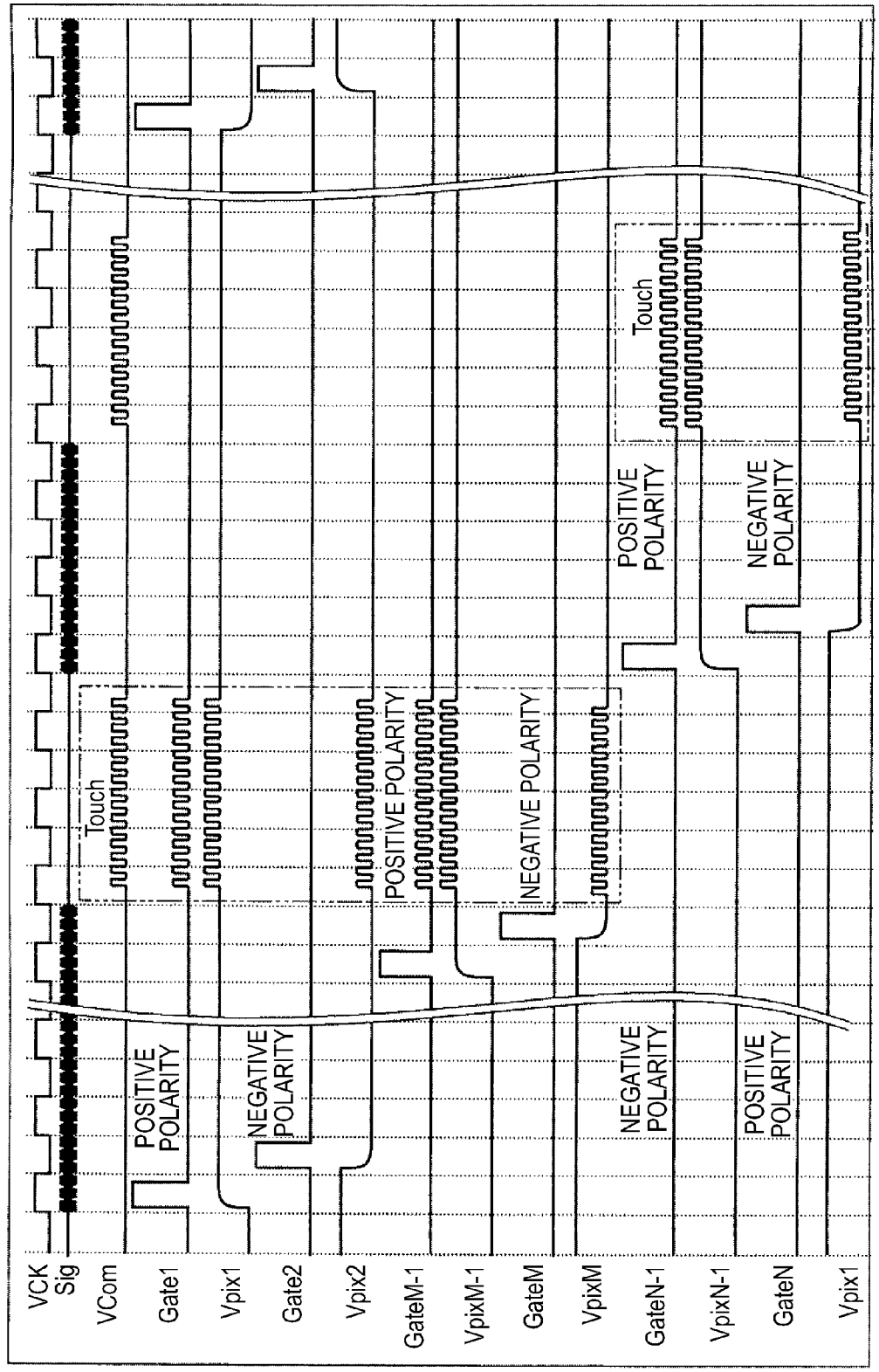
FIG. 13 shows timing charts for explaining the relation of potentials in the blanking period.

FIG. 13 shows timing charts for explaining variation of gate potentials in the vertical blanking period. When comparing the timing charts shown in FIG. 13 with the timing charts shown in FIG. 12, a point that the gate potential of positive polarity pixels is synchronized with the common drive signal Vcom is different.

The common drive signal Vcom is a signal with a given cycle during the vertical blanking period, in which the potential VcomA and the potential VcomB are repeated with a given cycle, sequentially supplied to respective pixels. When assuming that the Gate1 is the potential of the gate line 1 connected to the positive polarity pixels in the same manner as the case explained with reference to FIG. 12, the positive polarity pixels connected to the gate line 1 are turned on when the potential GateA is switched to the potential GateB at a timing shown in FIG. 13, and writing is performed based on the video signal. The potential Vpix1 is maintained in the potential VpixC after the writing is performed.

When the vertical blanking period starts and the common drive signal Vcom in which the potential VcomA and the potential VcomB are cyclically repeated is added while the potential Vpix1 of the liquid crystal capacitor C is maintained in the potential VpixC, the Vpix1 of the liquid crystal capacitor C becomes a signal in which the potential VpixC and the potential VpixD are repeated so as to correspond to the cycle. Then, the potential of Gate1 will be a signal in which the potential GateA and the potential GateC are repeated.

As described above, the potential of Gate1 will be a signal in which the potential GateA and the potential GateC are repeated in the same cycle as the cycle of the common drive signal Vcom during the blanking period at the time of the positive polarity. In such case, for example, the switch 171 of the gate buffer 161 (FIG. 11B) switches the connection to the terminal "a" or the terminal "b" so as to correspond to the cycle of the common drive signal Vcom. The gate buffer 161 outputs the signal in the potential GateA from the VGL1 line supplied through the terminal to be connected or outputs the signal in the potential GateC from the VGL2 line.

In the negative polarity pixels, the signal in which the potential is switched to the potential GateB only when turning on the TFT circuit 61 and is the potential GateA in other periods is supplied. Also in this case, the TFT circuits 61 of the negative polarity pixels are controlled so as not to exceed the withstand voltage.

[Gate Potential in Horizontal Blanking Period]

Figure 14:
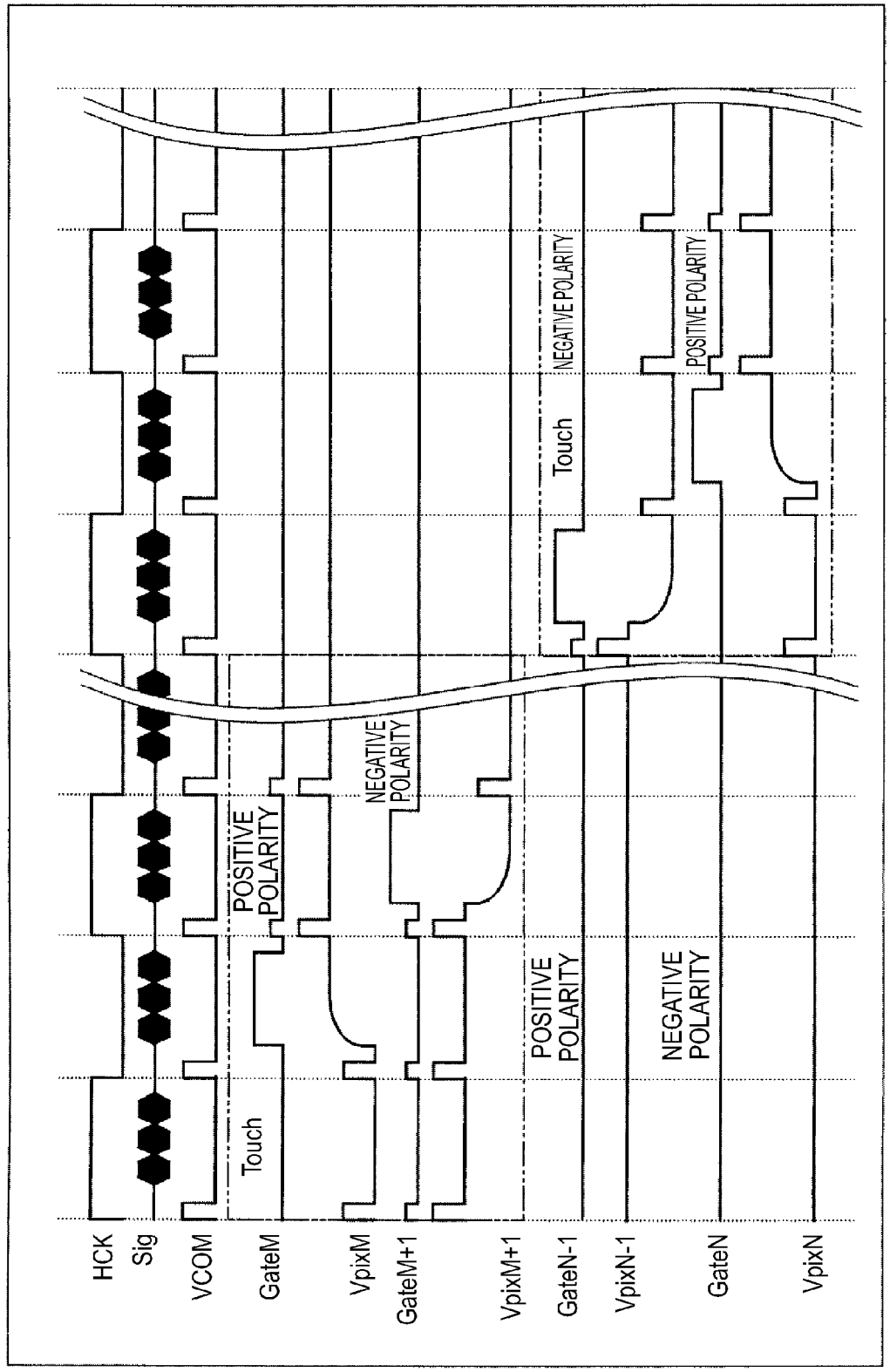
FIG. 14 shows timing charts for explaining the relation of potentials in the blanking period.

FIG. 14 shows timing charts for explaining variation of gate potentials in a horizontal blanking period. A potential applied to gates of the TFT circuits 61 of the positive polarity in synchronization with the given cycle of the common drive signal Vcom, for example, GateM will be a signal in which the potential GateA and the potential GateC are repeated also during the horizontal blanking period. When the timing of writing comes during the period, the potential GateA is switched to the potential GateB for turning on the TFT circuits 61.

As described above, at the time of the positive polarity, the gate potential will be the signal in which the potential GateA and the potential GateC are repeated in the same cycle as the cycle of the common drive signal Vcom during the horizontal blanking period and during periods other than a period when the TFT circuits 61 is turned on. At the time of negative polarity, the gate potential will be a signal in which the potential GateB is taken only when the TFT circuits 61 are turned on and the potential GateA is taken in other periods regardless of the horizontal blanking period.

The variation of the gate potentials in the horizontal blanking period shown in FIG. 14 is the same in the case where the gate potential in the vertical blanking period shown in FIG. 12 becomes high during the period when the device functions as the touch panel and in the case where the gate potential in the horizontal blanking period shown in FIG. 13 becomes high in synchronization with the common drive signal Vcom.

As the signal supplied to the gates of positive polarity pixels is the signal in synchronization with the common drive signal Vcom during the blanking period as described above, the potential of the negative supply of the gates is also increased corresponding to the variation even when the potential Vpix1 of the liquid crystal capacitor C varies between the potential VpixC and the potential VpixD as explained with reference to FIGS. 8A and 8B, therefore, the potential can be controlled without exceeding the withstand voltage of the TFT circuit 61. Additionally, the gate negative voltage is maintained in the potential GateC during the blanking period when the device functions as the touch sensor, thereby increasing the amplitude of the common drive signal Vcom supplied during the blanking period (increasing the potential difference between the potential VcomA and the potential VcomB), which can improve the performance as the sensor.

[Case Where Same Gate Signal is used in Positive Polarity and Negative Polarity]

In the above embodiment, the case where different gate signals are used for the positive polarity and the negative polarity has been explained as the example. It is possible to use the same gate signal for the positive polarity and the negative polarity. As shown in FIG. 13 and FIG. 14, the gate potential becomes high in synchronization with the common drive signal Vcom during the vertical blanking period and the horizontal blanking period also at the time of the negative polarity, thereby configuring the device so that the same gate signal is used for the positive polarity and the negative polarity.

Figure 15:
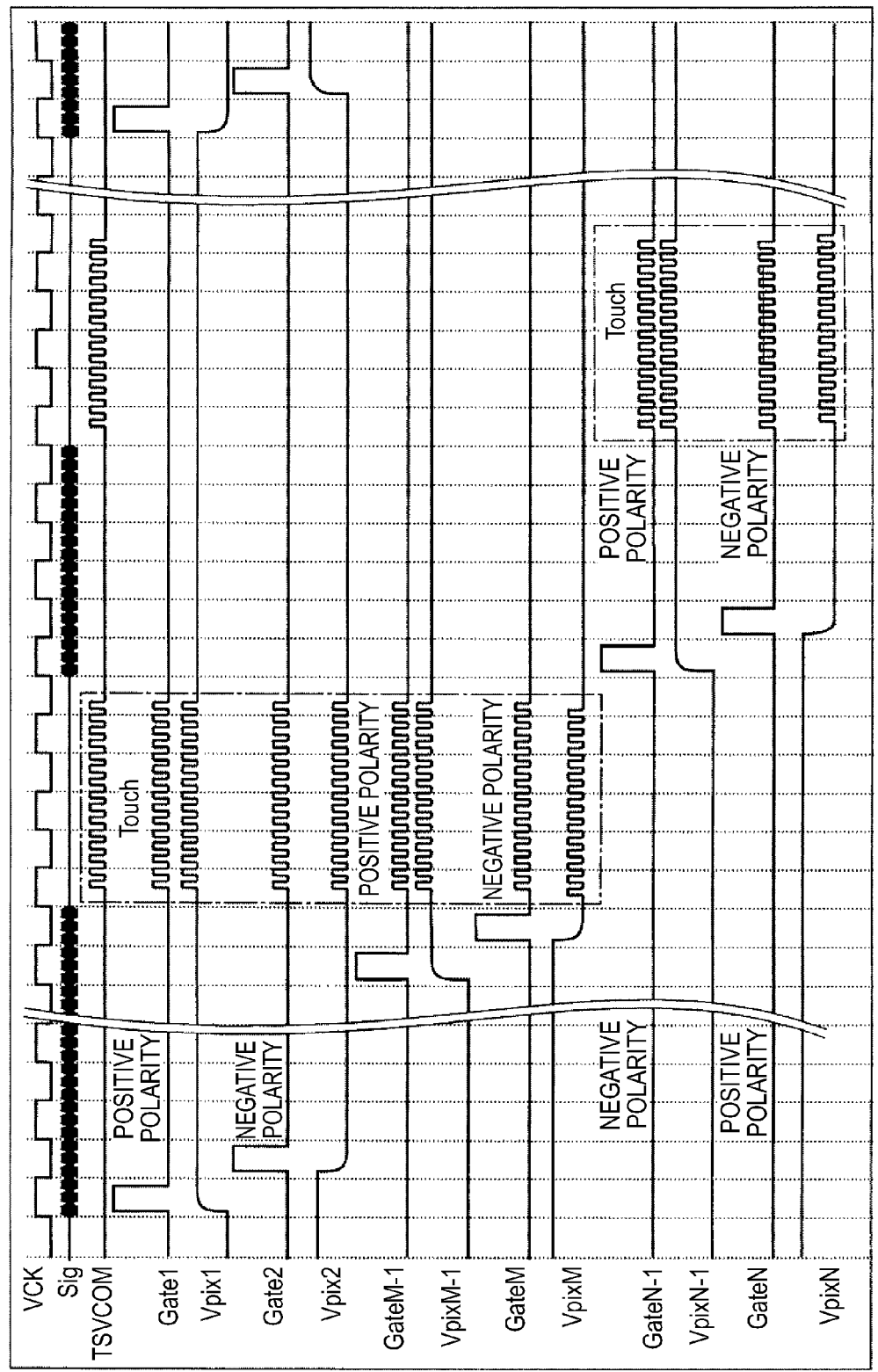
FIG. 15 shows timing charts for explaining the relation of potentials in the blanking period.

Timing charts in the case where the gate potential becomes high in synchronization with the common drive signal Vcom during the vertical blanking period also at the time of the negative polarity are shown in FIG. 15. In the timing charts shown in FIG. 15, timing charts concerning the positive polarity are the same as the timing charts concerning the positive polarity in the timing charts shown in FIG. 13, and the potential of Gate1 will be a signal in which the potential GateA and the potential GateC are repeated in the same cycle as the cycle of the common drive signal Vcom during the vertical blanking period.

Next, variation in potentials of negative polarity pixels will be explained. The common drive signal Vcom is a signal with a given cycle during the vertical blanking period, in which the potential VcomA and the potential VcomB are repeated with a given cycle, sequentially supplied to respective pixels. When assuming that Gate2 is the potential of the gate line 2 connected to the negative polarity pixels, the negative polarity pixels connected to the gate line 2 are turned on when the potential GateA is switched to the potential GateB at a timing shown in FIG. 15, and writing is performed based on the video signal. The potential Vpix2 is maintained in the potential VpixA (FIG. 8A) after the writing is performed.

When the vertical blanking period starts and the common drive signal Vcom in which the potential VcomA and the potential VcomB are cyclically repeated is added while the potential Vpix2 of the liquid crystal capacitor C is maintained in the potential VpixA, the potential Vpix2 of the liquid crystal capacitor C becomes a signal in which the potential VpixA and the potential VpixB (FIG. 8A) are repeated so as to correspond to the cycle. Then, the potential of Gate2 will be a signal in which the potential GateA and the potential GateC are repeated.

As described above, the potential of Gate2 will be a signal in which the potential GateA and the potential GateC are repeated in the same cycle as the cycle of the common drive signal Vcom during the blanking period also in the negative polarity in the same manner as the case of the positive polarity. That is, as shown in FIG. 15, the same signal is supplied to positive polarity pixels and negative polarity pixels as the gate signal respectively regardless of the polarity.

Figure 16:
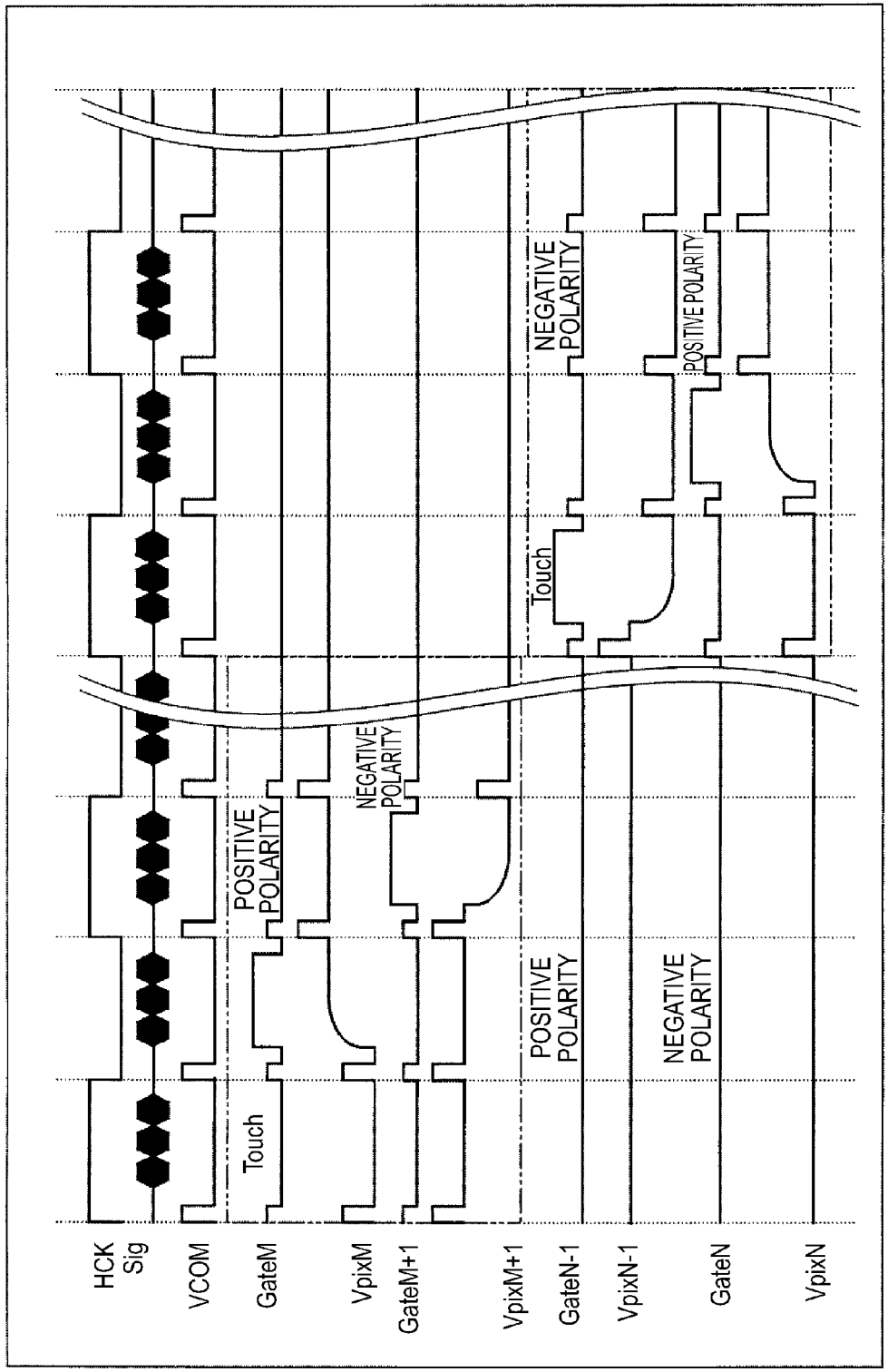
FIG. 16 shows timing charts for explaining the relation of potentials in the blanking period.

In the case where the gate potential becomes high in synchronization with the common drive signal Vcom at the time of the negative polarity, timing charts will be as shown in FIG. 16 also in the horizontal blanking period. In the timing charts shown in FIG. 16, timing charts concerning the positive polarity are the same as the timing charts concerning the positive polarity in the timing charts shown in FIG. 14, therefore, the explanation thereof is omitted.

During the horizontal blanking period, a potential to be applied to gates of TFT circuits 61 in the negative polarity in synchronization with the given cycle of the common drive signal Vcom, for example, GateM+1 will be a signal in which the potential GateA and the potential GateC are repeated. When the timing of writing comes during the period, the potential GateA is switched to the potential GateB for turning on the TFT circuits 61.

The above variation of potentials is the same as variation of the gate potential with respect to the positive polarity. As described above, the potential will be a signal in which the potential Gate A and the potential GateC are repeated in the same cycle as the cycle of the common drive signal Vcom during periods other than the period when turning on the TFT circuits 61 in the horizontal period also at the time of the negative polarity in the same manner as the positive polarity.

The switch 171 of the gate buffer 161 (FIG. 11B) connected to target pixels of the positive polarity and the negative polarity switches the connection to the terminal "a" or the terminal "b" so as to correspond to the cycle of the common drive signal Vcom. The gate buffer 161 outputs the signal in the potential GateA from the VLG1 line supplied through the connected terminal or the signal in the potential GateC from the VGL2 line.

As the same signal is supplied to the positive polarity pixels and the negative polarity pixels as the gate signal respectively regardless of the polarity, it is not necessary to allow the gate negative supply to be independent for the negative polarity and the positive polarity, which is different from the case where different gate signals are supplied for the positive polarity and for the negative polarity. Accordingly, the polarity arrangement pattern of pixels and the connection pattern of gate lines can be the structure shown in FIG. 9A. FIG. 9A shows the case where the same gate signal is used for the negative polarity and the positive polarity, which is the case where the polarity arrangement pattern is the pattern called the dot inversion drive.

It is not necessary to allow the gate negative supply to be independent for the negative polarity and the positive polarity in the embodiment, however, it is also possible to apply the dot inversion drive as the polarity arrangement pattern and the connection pattern in which the gate lines connect pixels of the same polarity as shown in FIG. 9B. Moreover, in the line inversion drive as shown in FIG. 10, the embodiment in which the same gate signal is supplied to pixels of the positive polarity and the negative polarity can be applied.

As the gate signal which is synchronized with the amplitude of the common drive signal Vcom is supplied also at the time of the negative polarity, the connection pattern of gate lines can be designed so as to correspond to the related-art connection pattern (the pattern shown in FIG. 9A) and to the related-art polarity arrangement pattern (patterns shown in FIG. 9B and FIG. 10).

Moreover, as the signal supplied to gates of pixels of the positive polarity and the negative polarity is synchronized with the common drive signal Vcom during the blanking period, the negative supply of the gates becomes high so as to correspond to variation of the potential Vpix1 of the liquid crystal capacitor C between the potential VpixC and the potential VpixD, therefore, it is possible to control the circuit not to exceed the withstand voltage of the TFT circuit 61 of the pixel even when the pixel is the positive polarity.

Furthermore, as the gate negative voltage is maintained in the potential GateC during the blanking period when the device functions as the touch sensor, the amplitude of the common drive signal Vcom supplied during the blanking period can be increased (the potential difference between the potential VcomA and the potential VcomB can be increased), which improve the performance as the sensor.

As explained with reference to the timing charts shown in FIG. 12, in the case of applying the configuration in which the potential of the gate negative supply is maintained to be high with respect to the positive polarity pixels, not being synchronized with the amplitude of the common drive signal Vcom during the vertical blanking period (during the period when functioning as the touch panel), it is not preferable to apply the configuration in which the potential of the gate negative supply is maintained to be high also with respect to the negative polarity pixels.

If the configuration in which the potential of the gate negative supply is maintained to be high with respect to the negative polarity pixel during the blanking period, there is a possibility that the potential of negative polarity pixels leaks. Accordingly, it is necessary to configure the device so that the potential of the negative polarity pixels does not leak, and it is not preferable to apply the configuration in which the potential of the gate negative supply is maintained to be high during the blanking period.

Consequently, as explained with reference to FIG. 12, it is preferable to apply the configuration in which the potential of the gate negative supply is maintained to be high with respect to the positive polarity pixels during the blanking period and the potential of the gate negative supply is not maintained to be high with respect to the negative polarity pixels during the blanking period. In other words, it is preferable that the gate negative supply is allowed to be independent for the negative polarity and the positive polarity and that the potential of the gate negative supply is increased only with respect to the positive polarity pixels.

[Advantages]

As described above, according to the embodiment of the present disclosure, it is possible to prevent the voltage of the TFT circuits to exceed the withstand voltage by increasing the potential of the gate negative supply with respect to the positive polarity pixels when the display device with the touch sensor functions as the touch sensor. As the potential of the gate negative supply is increased, the potential of the common drive signal Vcom can be increased accordingly (more than the increase by the gate negative supply) to be applied to the TFT circuits. Accordingly, it is possible to increase the amplitude of the common drive signal Vcom and to thereby increase the performance as the touch sensor.

Moreover, as the period during which the potential of the gate negative supply is increased is provided in the vertical blanking period or the horizontal blanking period which is not the writing period with respect to pixels, it is possible to prevent occurrence of leakage due to image data.

Furthermore, the potential of the gate negative supply is increased, thereby reducing the difference between "a potential difference Vpix+ between a potential Vpix+ of positive polarity pixels and a potential VGate of Gate" and "a potential difference Vpix− between a potential Vpix− of negative polarity pixels and a potential VGate of Gate". The difference of leakage amounts of potentials between the positive polarity and the negative polarity can be reduced by reducing the above difference. As a result, it is possible to suppress flicker and to increase the image quality.

[Recording Media]

The above series of processing can be executed by hardware as well as software. When the series of processing is executed by software, programs included in the software are installed to a computer. Here, the computer includes a computer incorporated in dedicated hardware, a general-purpose personal computer capable of executing various functions by installing various programs and so on.

Figure 17:
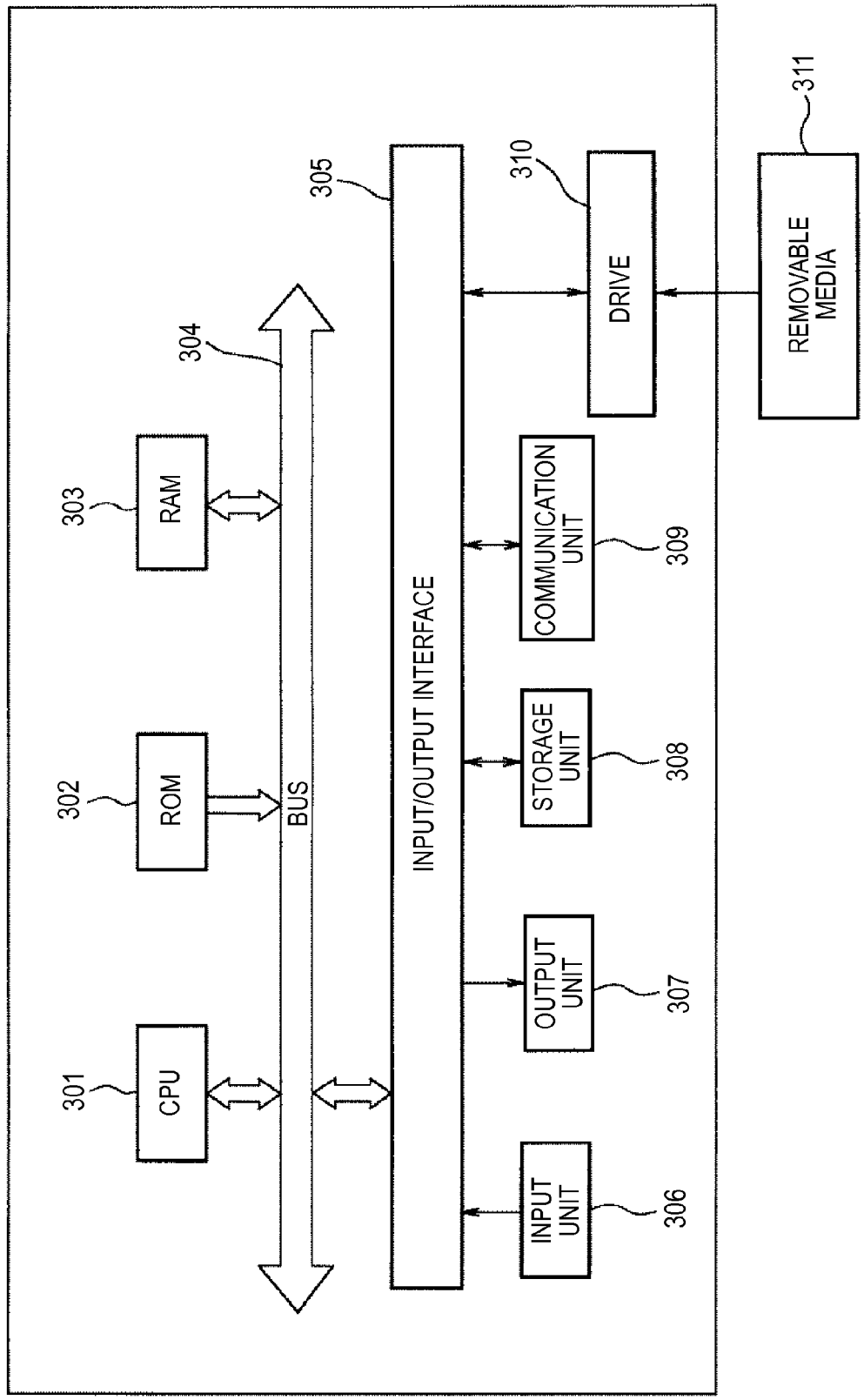
FIG. 17 is a diagram for explaining recording media.

FIG. 17 is a block diagram showing a configuration example of hardware of the computer executing the above series of processing by a program. In the computer, a CPU (Central Processing Unit) 301, a ROM (Read Only Memory) 302, a RAM (Random Access Memory) 303 are mutually connected by a bus 304. An input/output interface 305 is further connected to the bus 304. An input unit 306, an output unit 307, a storage unit 308, a communication unit 309 and a drive 310 are connected to the input/output interface 305.

The input unit 306 includes a keyboard, a mouse, a microphone and so on. The output unit 307 includes a display, a speaker and so on. The storage unit 308 includes a hard disk, a nonvolatile memory and so on. The communication unit 309 includes a network interface and so on. The drive 310 drives removable media 311 such as a magnetic disc, an optical disc, a magneto-optical disc and a semiconductor memory.

In the computer configured as the above, the CPU 301 loads the program stored in, for example, the storage unit 308 to the RAM 303 through the input/output interface 305 and the bus 304 and executes the program, thereby performing the above series of processing.

The program executed by the computer (CPU 301) can be provided by recording the program in the removable media 311 such as package media. The program can be provided through wired or wireless transmission media such as a local area network, Internet and digital satellite broadcasting.

In the computer, program can be installed in the storage media 308 through the input/output interface 305 by mounting the removable media 311 on the drive 310. The program can be also installed in the storage 308 by receiving by the communication unit 309 through wired or wireless transmission media. The program can be also installed in advance in the ROM 302 or the storage 308.

The program executed by the computer may be a program in which processing is performed in time series along the order explained in the present specification as well as a program in which processing is performed in parallel or at a necessary timing such as calling is performed.

In the present specification, the system indicates the entire device including plural devices.

The embodiment of the present disclosure is not limited to the above embodiment but various modifications can be made within a scope not departing from the gist of the present disclosure.

The present disclosure may be configured as the following structures.

(1) A display device with a touch sensor including
plural display pixel electrodes,
a common electrode arranged opposite to the display pixel electrodes,
a display function layer having an image display function,
a display control circuit performing image display control so as to fulfill the display function of the display function layer by applying a voltage for display between the display pixel electrodes and the common electrode based on an image signal, and
a touch detection electrode provided opposite to the common electrode and forming capacitance between the touch detection electrode and the common electrode,
in which a drive voltage for display applied to the common electrode by the display control circuit is used as a drive signal for the touch sensor, and
a gate potential of TFT circuits included in the display pixel electrodes is increased during a period when the drive signal for the touch sensor is applied.

(2) The display device with the touch sensor described in the above (1),
in which the gate potential is in a high state during a vertical blanking period and a horizontal blanking period.

(3) The display device with the touch sensor described in the above (2),
in which the gate potential becomes in the high state in synchronized with the drive signal for the touch sensor.

(4) The display device with the touch sensor described in any of the above (1) to (3),
in which the gate potential becomes in a high state when writing in a positive polarity display voltage is performed.

(5) A potential control method of a display device with a touch sensor including
plural display pixel electrodes,
a common electrode arranged opposite to the display pixel electrodes,
a display function layer having an image display function,
a display control circuit performing image display control so as to fulfill the display function of the display function layer by applying a voltage for display between the display pixel electrodes and the common electrode based on an image signal, and
a touch detection electrode provided opposite to the common electrode and forming capacitance between the touch detection electrode and the common electrode, the method including
using a drive voltage for display applied to the common electrode by the display control circuit as a drive signal for the touch sensor, and
increasing a gate potential of TFT circuits included in the display pixel electrodes is increased during a period when the drive signal for the touch sensor is applied.

(6) A program for a computer controlling a display device with a touch sensor including
plural display pixel electrodes,
a common electrode arranged opposite to the display pixel electrodes,
a display function layer having an image display function,
a display control circuit performing image display control so as to fulfill the display function of the display function layer by applying a voltage for display between the display pixel electrodes and the common electrode based on an image signal, and
a touch detection electrode provided opposite to the common electrode and forming capacitance between the touch detection electrode and the common electrode, the program allowing the computer to execute processing of
using a drive voltage for display applied to the common electrode by the display control circuit as a drive signal for the touch sensor, and
increasing a gate potential of TFT circuits included in the display pixel electrodes is increased during a period when the drive signal for the touch sensor is applied.

(7) A display device with a touch sensor including
plural display pixel electrodes,
a common electrode arranged opposite to the display pixel electrodes,
a display function layer having an image display function,
a display control circuit performing image display control so as to fulfill the display function of the display function layer by applying a voltage for display between the display pixel electrodes and the common electrode based on an image signal, and
a touch detection electrode provided opposite to the common electrode and forming capacitance between the touch detection electrode and the common electrode, in which a drive voltage for display applied to the common electrode by the display control circuit is used as a drive signal for the touch sensor, and a signal supplied to gates of TFT circuits included in the display pixel electrodes is a signal in which different three potentials are switched at given timings.

(8) The display device with the touch sensor described in the above (7), in which the three potentials includes a first potential to be a reference, a second potential for turning on the TFT circuits and a third potential at the time of supplying the drive signal for the touch sensor.

(9) The display device with the touch sensor described in the above (8), in which a potential of the signal supplied to gates of the TFT circuits in a vertical blanking period and in a horizontal blanking period is the third potential.

(10) The display device with the touch sensor described in any of the above (7) to (9), in which the signal supplied to gates of the TFT circuits is a signal synchronized with the drive signal for the touch sensor, in which the first potential and the third potential are repeated.

(11) The display device with the touch sensor described in any of the above (7) to (10), in which the signal supplied to gates of the TFT circuits is a signal in which different three potentials are switched at given timings when writing in a positive polarity display voltage is performed, and is a signal in which two potentials of the different three potentials are switched at given timings when writing in a negative polarity display voltage is performed.

(12) A potential control method of a display device with a touch sensor including plural display pixel electrodes, a common electrode arranged opposite to the display pixel electrodes, a display function layer having an image display function, a display control circuit performing image display control so as to fulfill the display function of the display function layer by applying a voltage for display between the display pixel electrodes and the common electrode based on an image signal, and a touch detection electrode provided opposite to the common electrode and forming capacitance between the touch detection electrode and the common electrode, the method including using a drive voltage for display applied to the common electrode by the display control circuit as a drive signal for the touch sensor, and allowing a signal supplied to gates of TFT circuits included in the display pixel electrodes to be a signal in which different three potentials are switched at given timings.

(13) A program for a computer controlling a display device with a touch sensor including plural display pixel electrodes, a common electrode arranged opposite to the display pixel electrodes, a display function layer having an image display function, a display control circuit performing image display control so as to fulfill the display function of the display function layer by applying a voltage for display between the display pixel electrodes and the common electrode based on an image signal, and a touch detection electrode provided opposite to the common electrode and forming capacitance between the touch detection electrode and the common electrode, the program allowing the computer to execute processing of using a drive voltage for display applied to the common electrode by the display control circuit as a drive signal for the touch sensor, and allowing a signal supplied to gates of TFT circuits included in the display pixel electrodes to be a signal in which different three potentials are switched at given timings.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A display device with a touch sensor comprising:
plural display pixel electrodes;
a common electrode arranged opposite to the display pixel electrodes;
a display function layer having an image display function;
a display control circuit performing image display control so as to fulfill the display function of the display function layer by applying a voltage for display between the display pixel electrodes and the common electrode based on an image signal; and
a touch detection electrode provided opposite to the common electrode and forming capacitance between the touch detection electrode and the common electrode,
wherein a drive voltage for display applied to the common electrode by the display control circuit is used as a drive signal for the touch sensor,
wherein a signal supplied to gates of TFT circuits included in the display pixel electrodes is one of a pulse wave signal and a signal in which different three potentials are switched at given timings, and
wherein the three potentials include a first potential during the TFT circuits being off, a second potential for turning on the TFT circuits, and a third potential at the time of supplying the drive signal for the touch sensor.

2. The display device with the touch sensor according to claim 1,
wherein a potential of the signal supplied to gates of the TFT circuits in a vertical blanking period and in a horizontal blanking period is the third potential, and
the third potential is higher than the first potential.

3. The display device with the touch sensor according to claim 1,
wherein the signal supplied to gates of the TFT circuits is the pulse wave signal synchronized with the drive signal for the touch sensor, in which the first potential and the third potential are repeated.

4. The display device with the touch sensor according to claim 1,
wherein the signal supplied to gates of the TFT circuits is a signal in which different three potentials are switched at given timings when writing in a positive polarity display voltage is performed, and is a signal in which two potentials of the different three potentials are switched at given timings when writing in a negative polarity display voltage is performed.

5. A potential control method of a display device with a touch sensor including
plural display pixel electrodes,
a common electrode arranged opposite to the display pixel electrodes, a display function layer having an image display function,
a display control circuit performing image display control so as to fulfill the display function of the display function layer by applying a voltage for display between the display pixel electrodes and the common electrode based on an image signal, and
a touch detection electrode provided opposite to the common electrode and forming capacitance between the touch detection electrode and the common electrode, the method comprising:
using a drive voltage for display applied to the common electrode by the display control circuit as a drive signal for the touch sensor; and
allowing a signal supplied to gates of TFT circuits included in the display pixel electrodes to be one of a pulse wave signal and a signal in which different three potentials are switched at given timings, and
wherein the three potentials include a first potential during the TFT circuits being off, a second potential for turning on the TFT circuits, and a third potential at the time of supplying the drive signal for the touch sensor.

6. A non-transitory computer program product stored on a computer readable medium that when executed by a processor performs steps for controlling a display device with a touch sensor including
plural display pixel electrodes,
a common electrode arranged opposite to the display pixel electrodes,
a display function layer having an image display function,
a display control circuit performing image display control so as to fulfill the display function of the display function layer by applying a voltage for display between the display pixel electrodes and the common electrode based on an image signal, and
a touch detection electrode provided opposite to the common electrode and forming capacitance between the touch detection electrode and the common electrode, the steps including:
using a drive voltage for display applied to the common electrode by the display control circuit as a drive signal for the touch sensor, and
allowing a signal supplied to gates of TFT circuits included in the display pixel electrodes to be one of a pulse wave signal and a signal in which different three potentials are switched at given timings, and
wherein the three potentials include a first potential during the TFT circuits being off, a second potential for turning on the TFT circuits, and a third potential at the time of supplying the drive signal for the touch sensor.

7. A display device with a touch sensor comprising:
plural display pixel electrodes;
a common electrode arranged opposite to the display pixel electrodes;
a display function layer having an image display function;
a display control circuit performing image display control so as to fulfill the display function of the display function layer by applying a voltage for display between the display pixel electrodes and the common electrode based on an image signal; and
a touch detection electrode provided opposite to the common electrode and forming capacitance between the touch detection electrode and the common electrode,
wherein a drive voltage is applied to the common electrode for display in a display period by the display control circuit and is used as a drive signal for the touch sensor in a touch detection period, the display period is different from the touch detection period in which the drive signal for the touch sensor in a pulse wave pattern is applied, and
a gate potential of TFT circuits included in the display pixel electrodes is increased during the touch detection period.

8. The display device with the touch sensor according to claim 7,
wherein the gate potential during the touch detection period including a vertical blanking period and a horizontal blanking period is higher than a gate potential when TFT circuits are off.

9. The display device with the touch sensor according to claim 8,
wherein the signal supplied to gates of the TFT circuits is a pulse wave signal,
the gate potential becomes in the high state in synchronized with the drive signal for the touch sensor.

10. The display device with the touch sensor according to claim 7,
wherein the gate potential becomes in a high state when writing in a positive polarity display voltage is performed.

11. A potential control method of a display device with a touch sensor including
plural display pixel electrodes,
a common electrode arranged opposite to the display pixel electrodes,
a display function layer having an image display function,
a display control circuit performing image display control so as to fulfill the display function of the display function layer by applying a voltage for display between the display pixel electrodes and the common electrode based on an image signal, and
a touch detection electrode provided opposite to the common electrode and forming capacitance between the touch detection electrode and the common electrode, the method comprising:
using a drive voltage for display applied to the common electrode by the display control circuit in a display period,
using the drive voltage applied to the common electrode as a drive signal for the touch sensor in a touch detection period, and
increasing a gate potential of TFT circuits included in the display pixel electrodes during the touch detection period when the drive signal in a pulse wave for the touch sensor is applied,
wherein the display period is different from the touch detection period.

12. A non-transitory computer program product stored on a computer readable medium that when executed by a processor performs steps for controlling a display device with a touch sensor including
plural display pixel electrodes,
a common electrode arranged opposite to the display pixel electrodes,
a display function layer having an image display function,
a display control circuit performing image display control so as to fulfill the display function of the display function layer by applying a voltage for display between the display pixel electrodes and the common electrode based on an image signal, and
a touch detection electrode provided opposite to the common electrode and forming capacitance between the touch detection electrode and the common electrode, the steps including:

using a drive voltage for display applied to the common electrode by the display control circuit in a display period, and using the drive voltage applied to the common electrode as a drive signal for the touch sensor in a touch detection period, and increasing a gate potential of TFT circuits included in the display pixel electrodes during the touch detection period when the drive signal in a pulse wave for the touch sensor is applied, wherein the display period is different from the touch detection period.

* * * * *